(12) United States Patent
Miura et al.

(10) Patent No.: US 7,260,226 B1
(45) Date of Patent: Aug. 21, 2007

(54) INFORMATION RETRIEVING METHOD, INFORMATION RETRIEVING DEVICE, INFORMATION STORING METHOD AND INFORMATION STORAGE DEVICE

(75) Inventors: Masayoshi Miura, Chiba (JP); Susumu Yabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1166 days.

(21) Appl. No.: 09/830,222

(22) PCT Filed: Aug. 25, 2000

(86) PCT No.: PCT/JP00/05771

§ 371 (c)(1),
(2), (4) Date: Jun. 15, 2001

(87) PCT Pub. No.: WO01/16935

PCT Pub. Date: Mar. 8, 2001

(30) Foreign Application Priority Data

Aug. 26, 1999 (JP) .............................. P-11-239145

(51) Int. Cl.
*H04R 29/00* (2006.01)
(52) U.S. Cl. .......................................... 381/56; 381/58
(58) Field of Classification Search .................. 381/56, 381/57, 58, 77; 700/94; 84/602, 604; 369/32.01, 369/63
See application file for complete search history.

(56) References Cited

U.S. PATENT DOCUMENTS 6,990,443 B1 *  1/2006  Abe et al. ................... 704/222

2002/0172372 A1 *  11/2002  Tagawa et al. ................ 381/56
2006/0195322 A1 *  8/2006  Broussard et al. .......... 704/270

FOREIGN PATENT DOCUMENTS

EP        0 339 891         11/1989

(Continued)

OTHER PUBLICATIONS

Proceedings of 1998 IEEE International Conference on Acoustics, Speech and Signal Processing, vol. 6, T. Lambrou et al., "Classification of audio signals using statistical features on time and wavelet transform domains", pp. 3621-3624, May 12-15, 1998.

(Continued)

*Primary Examiner*—Xu Mei
(74) *Attorney, Agent, or Firm*—Finnegan, Henderson, Farabow, Garrett & Dunner, L.L.P.

(57) ABSTRACT

A sound characteristic parameter is obtained for an audio signal to be analyzed by analyzing the signal by means of a sound characteristic parameter analyzing section arranged upstream relative to a similarity determining section. A sound signal operation as retrieving key is read out from a retrieving key storage area of a retrieving key memory by a retrieving key audio signal reading section and analyzed by a retrieving key sound characteristic parameter analyzing section to obtain a retrieving key sound characteristic parameter. The similarity determining section compares the sound characteristic parameter obtained from said sound characteristic parameter analyzing section and the retrieving key sound characteristic parameter obtained from said retrieving key sound parameter reading section and determines the similarity of them to retrieve a part of the audio signal to be analyzed that resembles the audio signal operating as retrieving key and obtained from the sound source of the retrieving key.

32 Claims, 15 Drawing Sheets

FOREIGN PATENT DOCUMENTS

| | | |
|---|---|---|
| JP | 7-105235 | 4/1995 |
| JP | 8-265660 | 10/1996 |
| JP | 9-9199 | 1/1997 |
| JP | 10-307580 | 11/1998 |
| JP | 5-334861 | 12/1998 |
| JP | 10-319948 | 12/1998 |

OTHER PUBLICATIONS

Proceedings of 1998 IEEE International Conference on Acoustics, Speech and Signal Processing, vol. 2, H. Soltau et al., "Recognition of music types", pp. 1137-1140, May 12-15, 1998.

Proceedings of the Fifth International Symposium on Signal Processing and its Applications, ISSPA'99, vol. 1, K. Melih et al., "Audio source type segmentation using a perceptually based representation", pp. 51-54, Aug. 22-25, 1999.

Transactions of the Institute of Electronics, Information and Communication Engineers, vol. J79-D-II, No. 11, Nov. 1996, Kunio Kashiwano et al., "Note recognition mechanisms in the OPTIMA processing architecture for music scene analysis", pp. 1751-1761, issued on Nov. 25, 1996.

IPSJ Sig Notes [SIGMUS], vol. 97, No. 18, 97-MUS-19-11, Kunio Kashiwano et al., "Sound source identification using adaptive template mixtures—Formulation and application to music stream segregation-", pp. 55-68, issued on Feb. 20, 1997.

Wilcox L et al: "Annotation and segmentation for multimedia indexing and retrieval" System Sciences, 1998., Proceedings of the Thirty-First Hawaii International Conference on Kohala Coast, HI, USA Jan. 6-9, 1998, Los Alamitos, CA, USA,IEEE Comput. Soc, US, vol. 2, Jan. 6, 1998, pp. 259-266, XP010262888 ISBN: 0-8186-8255-8.

\* cited by examiner

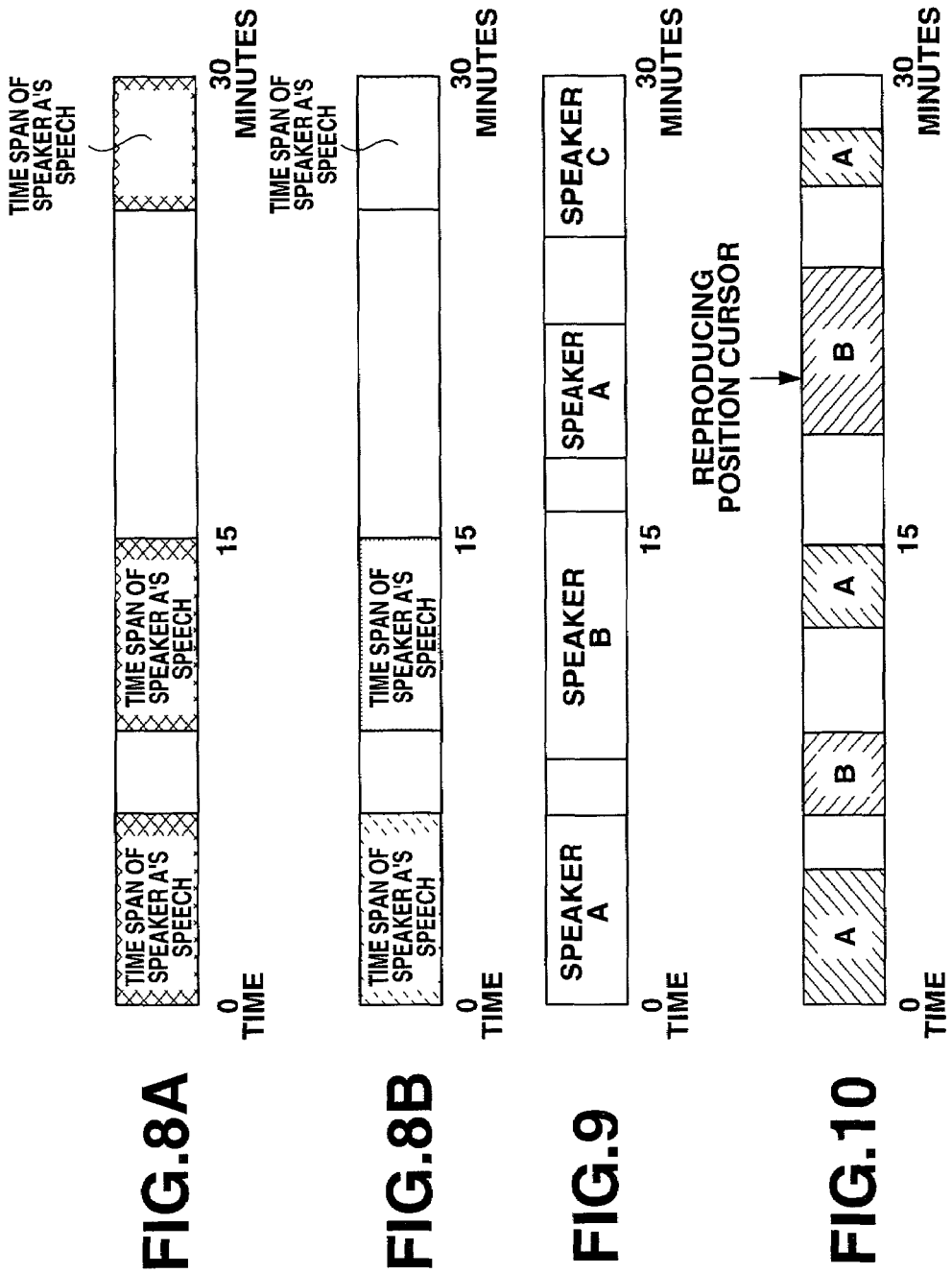

| RETRIEVING KEY No. | RETRIEVING KEY NAME | TIME SPAN DATA [ ST , ED ] |
|---|---|---|
| 1 | S | [ ADR1 , ADR5 ] , [ ADR11 , ADR20 ] |
| 2 | T | [ ADR1 , ADR10 ] , [ ADR41 , ADR45 ] |
| 3 | U | [ ADR23 , ADR29 ] |
| ⋮ | ⋮ | ⋮ |
| n | Z | [ ADR101 , ADR108 ] |

FIG.14

INFORMATION RETRIEVING METHOD, INFORMATION RETRIEVING DEVICE, INFORMATION STORING METHOD AND INFORMATION STORAGE DEVICE

TECHNICAL FIELD

This invention relates to a method and device for retrieving the sound of a specific instrument, a person or an animal out of an audio signal and/or the image of a specific person or a specific scene out of a video signal. The present invention also relates to a method and device for storing information that utilizes such a retrieving method.

BACKGROUND ART

There may be needs, for example, for retrieving a specific part of the audio signal representing the recorded discussion of a conference.

Conventionally, for instance, a specific part of the audio signal representing the recorded discussion of a conference and wanted by the user of the record can be retrieved by putting a maker to the specific part at the time of recording so that the user may easily retrieve that part the record any time he or she wants.

There is also known a method of recording a sound signal with counter readings or timings (normally expressed in terms of seconds, minutes and hours) from the start of the recording so that any part of the sound signal has a corresponding numerical value attached to it.

However, the user has to select any of the above methods, be it a method of putting markers or that of recording counter readings, considering what part of the recorded audio signal he or she will have to retrieve and use later. Therefore, these methods are accompanied by the following problems.

1. The user has to carry out an independent and cumbersome operation of putting markers or recording counter readings or timings.
2. The user cannot retrieve any part of the audio signal at which no marker is put or no counter reading is recorded.
3. The part of the signal of a speech of a specific speaker of a conference or a tune of a specific instrument of a concert cannot retrieved. In other words, the speeches of a specific speaker of a conference or the tunes of a specific instrument of a concert cannot be sorted out.
4. Since the proper audio signal has to be recorded with markers or counter readings, it is not possible to retrieve and sort a part of an audio signal by means of a plurality of retrievers without recording it.

DISCLOSURE OF THE INVENTION

In view of the above circumstances, it is therefore an object of the present invention to provide a method and an apparatus that can retrieve the part of a speech of a specific speaker or a tune of a specific instrument out of the recorded audio signal without requiring an operation of putting markers or recording counter readings or timings at the time of recording the audio signal.

It is another object of the present invention to provide a method and an apparatus that can retrieve a specific part of an audio signal produced from a specific sound source by using the part of the signal as retrieving cue.

According to the invention, the above objects and other objects of the invention are achieved by providing a sound retrieving method for retrieving a part of an audio signal to be analyzed resembling one or more than one audio signals operating as so many retrieving keys by comparing each of the retrieving key sound characteristic parameters obtained from respective audio signals operating as retrieving keys and dependent on structural factors of the sound source of the audio signals with the sound characteristic parameter obtained by analyzing said audio signal to be analyzed and computationally determining the similarity between them.

According to the invention, there is also provided a sound information storing method for recording an input audio signal on a recording medium and retrieving a part of an audio signal to be analyzed resembling one or more than one audio signals operating as so many retrieving keys by comparing each of the retrieving key sound characteristic parameters obtained from the respective audio signals operating as retrieving keys and dependent on structural factors of the sound source of the audio signals with the sound characteristic parameter obtained by analyzing said audio signal to be analyzed and computationally determining the similarity between them so as to record the result of the retrieving process as linked to said retrieving keys and the position used for recording said input audio signal on said recording medium.

In another aspect of the invention, there is also provided a sound information retrieving device comprising a sound characteristic parameter analyzing means for analyzing an audio signal to be analyzed and obtaining a sound characteristic parameter dependent on structural factors of the sound source of the audio signal, a retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys and a result displaying means for displaying the result of said retrieving process.

In still another aspect of the invention, there is provided a sound information retrieving device comprising a sound characteristic parameter analyzing means for analyzing an audio signal to be analyzed and obtaining a sound characteristic parameter dependent on structural factors of the sound source of the audio signal, a retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys and a reproducing means for extracting and reproducing only said resembling part according to the result of the retrieving process of said retrieving means.

In still another aspect of the invention, there is provided a sound information storage device comprising a recording means for recording an input audio signal on a recording medium, a sound characteristic parameter analyzing means for analyzing said input audio signal analyzed and obtaining a sound characteristic parameter dependent on structural factors of the sound source of the audio signal and a retrieving means for comparing sound characteristic parameters for one or more than one audio signals operating as retrieving keys and said sound characteristic parameter for the input audio signal and retrieving a part of the input audio signal to be analyzed resembling the audio signals operating as retrieving keys and obtained from the sound source of the retrieving keys, the result of the retrieving process of said retrieving means being recorded so as to be linked to said retrieving keys and the position used for recording said input audio signal on said recording medium.

In still another aspect of the invention, there is provided a sound/image information retrieving method for retrieving a part of an input signal including a video signal and an audio signal linked to said video signal, said method comprising retrieving a part of an audio signal to be analyzed resembling one or more than one audio signals operating as so many retrieving keys by comparing each of the retrieving key sound characteristic parameters obtained from respective audio signals operating as retrieving keys and dependent on structural factors of the sound source of the audio signals with the sound characteristic parameter obtained by analyzing said audio signal to be analyzed and computationally determining the similarity between them and producing the retrieved part as a result of the retrieving operation conducted on said input signal.

In still another aspect of the invention, there is provided a sound/image information retrieving method for retrieving a part of an input signal including a video signal and an audio signal linked to said video signal, said method comprising retrieving a part of an audio signal to be analyzed resembling one or more than one audio signals operating as so many retrieving keys by comparing each of the retrieving key sound characteristic parameters obtained from respective audio signals operating as retrieving keys and dependent on structural factors of the sound source of the audio signals with the sound characteristic parameter obtained by analyzing said audio signal to be analyzed and computationally determining the similarity between them and also retrieving a part of the video signal of said input signal to be analyzed resembling one or more than one images operating as so many retrieving keys by comparing each of the retrieving key image characteristic parameters operating as retrieving keys and showing the characteristics of the image of the video signal and the image characteristic parameter obtained by analyzing the video of said input to be analyzed, a part of said input signal being retrieved on the basis of the result of the retrieving process conducted on said audio signal and that of the retrieving process conducted on said video signal.

In still another aspect of the invention, there is provided a sound/image information storing method for recording an input signal including a video signal and an audio signal linked to said video signal on a recording medium, retrieving a part of an audio signal to be analyzed resembling one or more than one audio signals operating as so many retrieving keys by comparing each of the retrieving key sound characteristic parameters obtained from respective audio signals operating as retrieving keys and dependent on structural factors of the sound source of the audio signals with the sound characteristic parameter obtained by analyzing said audio signal to be analyzed and computationally determining the similarity between them and recording and recording the result of the retrieving process so as to be linked to said retrieving keys and the position used for recording said input audio signal on said recording medium.

In still another aspect of the invention, there is provided a sound/image information storing method for recording an input signal including a video signal and an audio signal linked to said video signal on a recording medium, retrieving a part of an audio signal to be analyzed resembling one or more than one audio signals operating as so many retrieving keys by comparing each of the retrieving key sound characteristic parameters obtained from respective audio signals operating as retrieving keys and dependent on structural factors of the sound source of the audio signals with the sound characteristic parameter obtained by analyzing said audio signal to be analyzed and computationally determining the similarity between them and recording, also retrieving a part of the video signal of said input signal to be analyzed resembling one or more than one images operating as so many retrieving keys by comparing each of the retrieving key image characteristic parameters operating as retrieving keys and showing the characteristics of the image of the video signal and the image characteristic parameter obtained by analyzing the video of said input to be analyzed and recording the result of the retrieving process conducted on said audio signal and said video signal so as to be linked to said retrieving keys and the position used for recording said input audio signal on said recording medium.

In still another aspect of the invention, there is provided a sound/image information retrieving device comprising a sound characteristic parameter analyzing means for analyzing the audio signal of an input signal including a video signal and an audio signal linked to said video signal and obtaining a sound characteristic parameter dependent on structural factors of the sound source of the audio signal, a retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys and a result displaying means for displaying the result of said retrieving process.

In still another aspect of the invention, there is provided a sound/image information retrieving device comprising a sound characteristic parameter analyzing means for analyzing the audio signal of an input signal including a video signal and an audio signal linked to said video signal and obtaining a sound characteristic parameter dependent on structural factors of the sound source of the audio signal, a retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys and a reproducing means for extracting and reproducing the part of said input signal corresponding to said resembling part.

In still another aspect of the invention, there is provided a sound/image information retrieving device comprising a sound characteristic parameter analyzing means for analyzing the audio signal of an input signal including a video signal and an audio signal linked to said video signal and obtaining a sound characteristic parameter dependent on structural factors of the sound source of the audio signal, a sound part retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys, an image part retrieving means for retrieving a part of the video signal of said input signal to be analyzed resembling one or more than one images operating as so many retrieving keys by comparing each of the retrieving key image characteristic parameters operating as retrieving keys and showing the characteristics of the image of the video signal and the image characteristic parameter obtained by analyzing the video of said input to be analyzed and a result displaying means for displaying the result of the retrieving process of said sound part retrieving means and that of the retrieving process of said image part retrieving means.

In still another aspect of the invention, there is provided a sound/image information retrieving device comprising a sound characteristic parameter analyzing means for analyzing the audio signal of an input signal including a video signal and an audio signal linked to said video signal and obtaining a sound characteristic parameter dependent on structural factors of the sound source of the audio signal, a sound part retrieving means for comparing sound characteristic parameters for audio signals operating as retrieving keys and said sound characteristic parameter for the audio signal to be analyzed obtained from said sound characteristic parameter analyzing means and retrieving a part of the audio signal to be analyzed resembling the audio signals operating as retrieving keys and obtained from the sound source of the retrieving keys, an image part retrieving means for retrieving a part of the video signal of said input signal resembling one or more than one images operating as so many retrieving keys by comparing each of the retrieving key image characteristic parameters operating as retrieving keys and showing the characteristics of the image of the video signal and the image characteristic parameter obtained by analyzing the video of said input to be analyzed and a reproducing means for extracting and reproducing the part of said input signal as determined on the basis of the result of the retrieving process of said sound part retrieving means and that of the retrieving process of said image part retrieving means.

In still another aspect of the invention, there is provided a sound/image information storage device comprising a recording means for recording an input signal including a video signal and an audio signal linked to said video signal on a recording medium, a sound characteristic parameter analyzing means for analyzing the audio signal of an input signal including a video signal and an audio signal linked to said video signal and obtaining a sound characteristic parameter dependent on structural factors of the sound source of the audio signal and a sound part retrieving means for comparing sound characteristic parameters for one or more than one audio signals operating as retrieving keys and said sound characteristic parameter for the audio signal of said input signal and retrieving a part of the audio signal of said input signal resembling the audio signals operating as retrieving keys, the result of the retrieving process of said sound part retrieving means being recorded so as to be linked to said retrieving keys and the position used for recording said input signal on said recording medium.

In a further aspect of the invention, there is provided a sound/image information storage device comprising a recording means for recording an input signal including a video signal and an audio signal linked to said video signal on a recording medium, a sound characteristic parameter analyzing means for analyzing the audio signal of an input signal including a video signal and an audio signal linked to said video signal and obtaining a sound characteristic parameter dependent on structural factors of the sound source of the audio signal and a sound part retrieving means for comparing sound characteristic parameters for one or more than one audio signals operating as retrieving keys and said sound characteristic parameter for the audio signal of said input signal and retrieving a part of the audio signal of said input signal resembling the audio signals operating as retrieving keys and an image part retrieving means for retrieving a part of the video signal of said input signal resembling one or more than one images operating as so many retrieving keys by comparing each of the retrieving key image characteristic parameters operating as retrieving keys and showing the characteristics of the image of the video signal and the image characteristic parameter obtained by analyzing the video of said input to be analyzed and determining the similarity of them, the result of the retrieving process of said sound part retrieving means and that of the retrieving process of said image part retrieving means being recorded so as to be linked to said retrieving keys and the position used for recording said input signal on said recording medium.

BRIEF DESCRIPTION OF THE DRAWINGS

FIGS. 8A and 8B are examples of displays of the result of the retrieving operation of the first embodiment.

FIG. 9 is another example of display of the result of the retrieving operation of the first embodiment.

FIG. 10 is still another example of display of the result of the retrieving operation of the first embodiment.

FIG. 14 is a schematic illustration of a principal part of a fifth embodiment of sound retrieving device according to the invention.

BEST MODE FOR CARRYING OUT THE INVENTION

Figure 1:
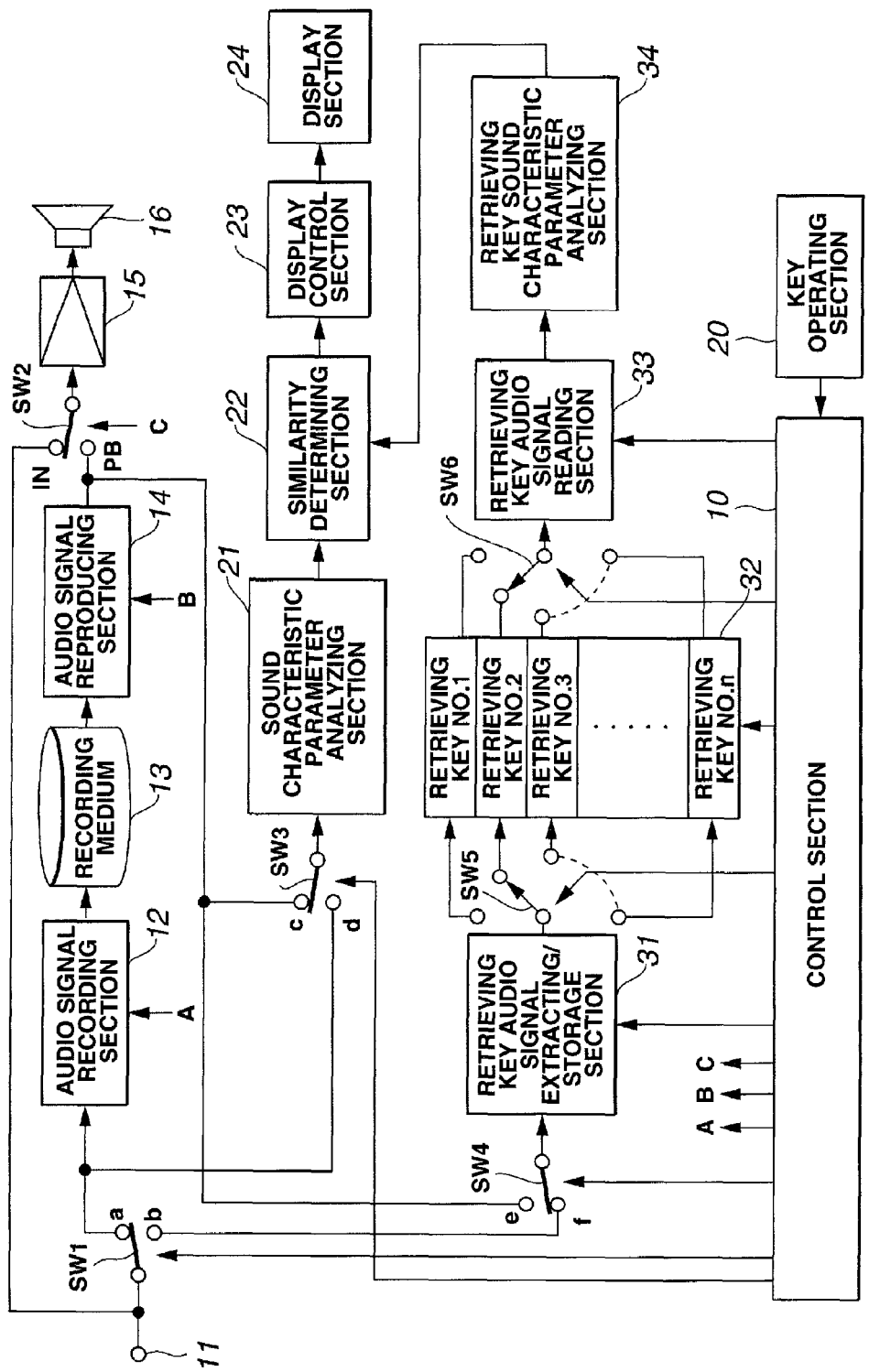
FIG. 1 is a schematic block diagram of a first embodiment of sound retrieving device according to the invention.

Now, the present invention will be described by referring to the accompanying drawings that illustrate the best mode of carrying out the invention.

Some of the preferred embodiments of the invention will be described by referring to the drawings.

1st Embodiment

FIG. 1 is a schematic block diagram of a first embodiment of the invention. This first embodiment is adapted to record the input audio signal to be scrutinized typically representing a sound that may be picked up by a microphone and reproduce the recorded signal. The embodiment is also adapted to retrieve reproduced audio signals. Furthermore, the embodiment is adapted to extract audio signals operating as retrieving keys out of the input or reproduced audio signal to be scrutinized, store them and actually scrutinize the input or reproduced audio signal by using stored audio signals operating as retrieving keys as well as to display the outcome of the scrutiny on a display section of the embodiment.

An input audio signal is fed to switching circuit SW1 by way of input terminal 11. The switching circuit SW1 is turned to the side of terminal a by a switching control signal fed from control section 10 when recording the input audio signal and to the side of terminal b by a switching signal also fed from the control section 10 when extracting the audio signals operating as retrieving keys out of the input audio signal.

The audio signal obtained at the side of the terminal a of the switching circuit SW1 is recorded on a recording medium 13 which is typically a memory card, a magnetic disk, an optical disk such as a magneto-optical disk or a hard disk by way of audio signal recording section 12. The audio signal recording section 12 of the embodiment is turned active to carry out a recording operation by a control signal fed from the control section 10 when a recording instruction is given to it by the user by way of key operating section 20.

The input audio signal entered by way of the input terminal 11 is also fed to input terminal IN of switching circuit SW2. An audio amplifier 15 and a loudspeaker 16 are arranged downstream and connected to the switching circuit SW2, which is turned to the side of the input terminal IN by a switching control signal from the control section 10 except when the embodiment is operated for signal reproduction as will be described hereinafter. Therefore, unless the embodiment is operated for signal reproduction, the input audio signal is fed to the loudspeaker 16 by way of the audio amplifier 15 to reproduce the sound of the audio signal.

As an instruction is given by the user for signal reproduction by way of the key operating section 20, the audio signal reproducing section 14 by the control signal from the control section 10 of the embodiment is turned active and the reproduced audio signal and read from the recording medium 13 is fed to input terminal PB of the switching circuit SW2. During the operation of signal reproduction, the switching circuit SW2 is turned to the side of the input terminal PB by a switching control signal from the control section 10. Therefore, the reproduced audio signal is fed to the loudspeaker 16 by way of the audio amplifier 15 to reproduce the sound of the audio signal.

The input audio signal obtained at the side of terminal a of the switching circuit SW1 is also fed to one of the input terminals, or input terminal d, of switching circuit SW3. The other input terminal, or input terminal c, of the switching circuit SW3 is fed with the reproduced audio signal from the audio signal reproducing section 14.

The switching circuit SW3 is adapted to select the audio signal to be scrutinized according to the instruction for selecting the audio signal for scrutiny given by the user by way of the key operating section 20.

The audio signal to be scrutinized as obtained from the switching circuit SW3 is then fed to sound characteristic parameters analyzing section 21, which typically analyzes sound characteristic parameters that are dependent on structural factors of sound sources such as the structures and the resonance systems of sound emitters that are normally different from each other. Sound characteristic parameters that can be used for the purpose of the invention include pitch frequency, higher harmonic frequencies of pitch frequency, formant frequencies, cepstrum information, linear prediction coefficient and residual signal thereof and PARCOR coefficient.

Figure 2A:
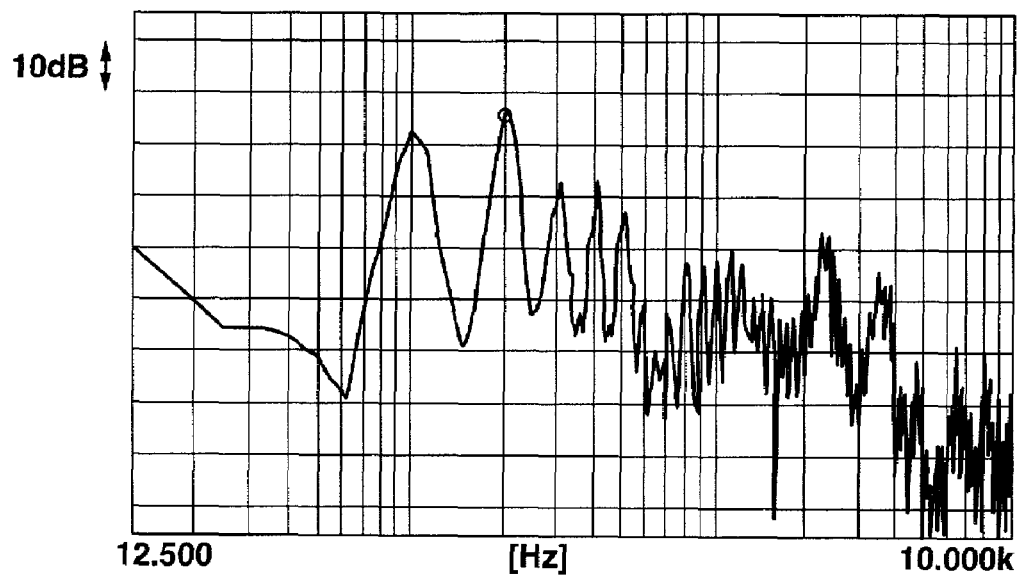
FIGS. 2A and 2B respectively illustrate a typical frequency component distribution pattern and a temporal waveform of man's voice.
Figure 2B:
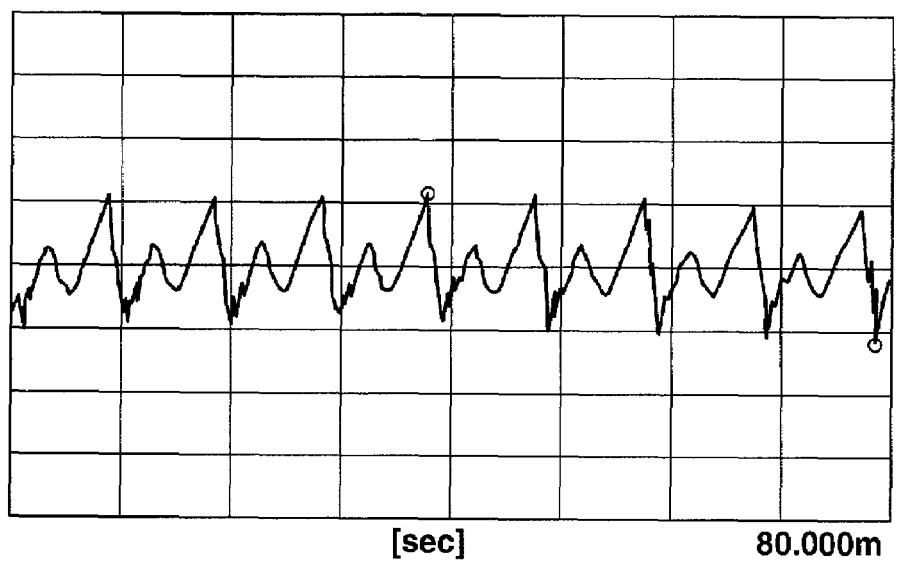
Figure 3A:
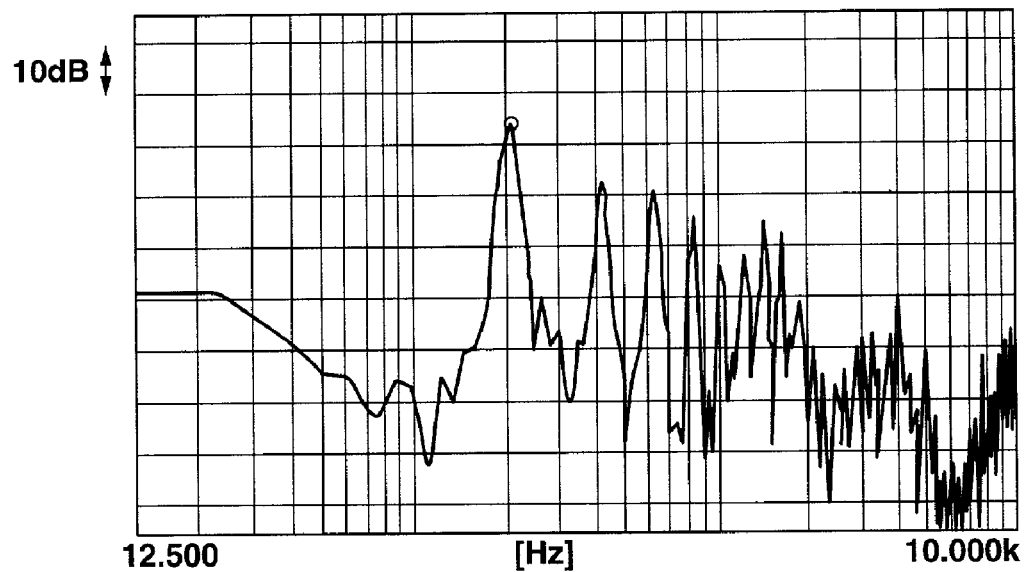
FIGS. 3A and 3B respectively illustrate a typical frequency component distribution pattern and a temporal waveform of woman's voice.
Figure 3B:
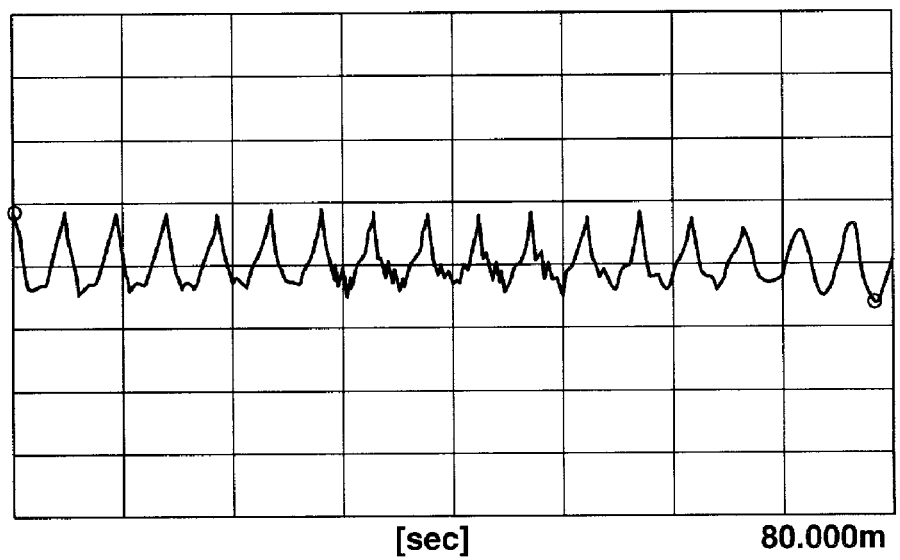
Figure 4A:
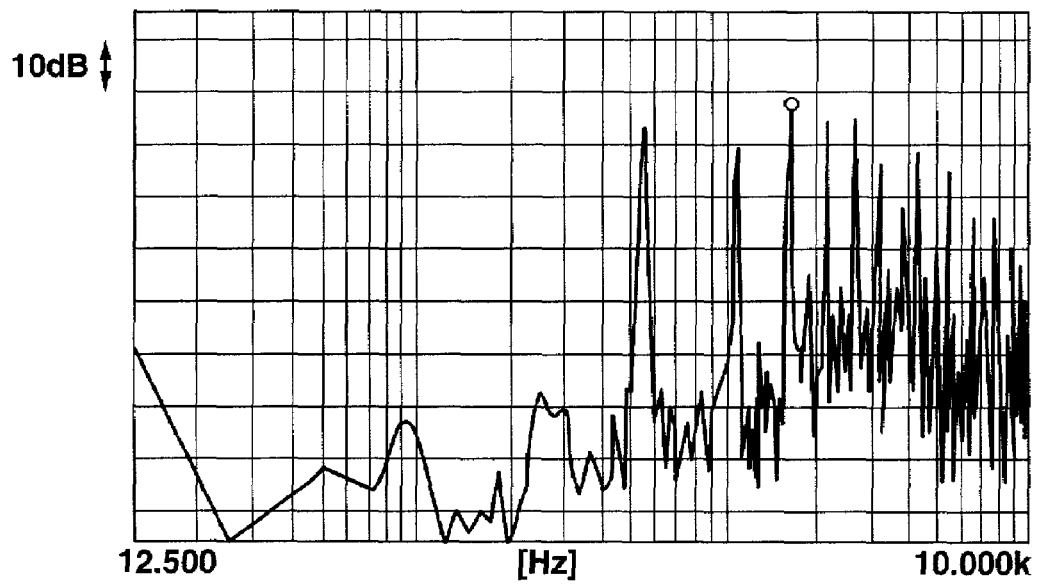
FIGS. 4A and 4B illustrate a typical frequency component distribution pattern and a temporal waveform of saxophone.
Figure 4B:
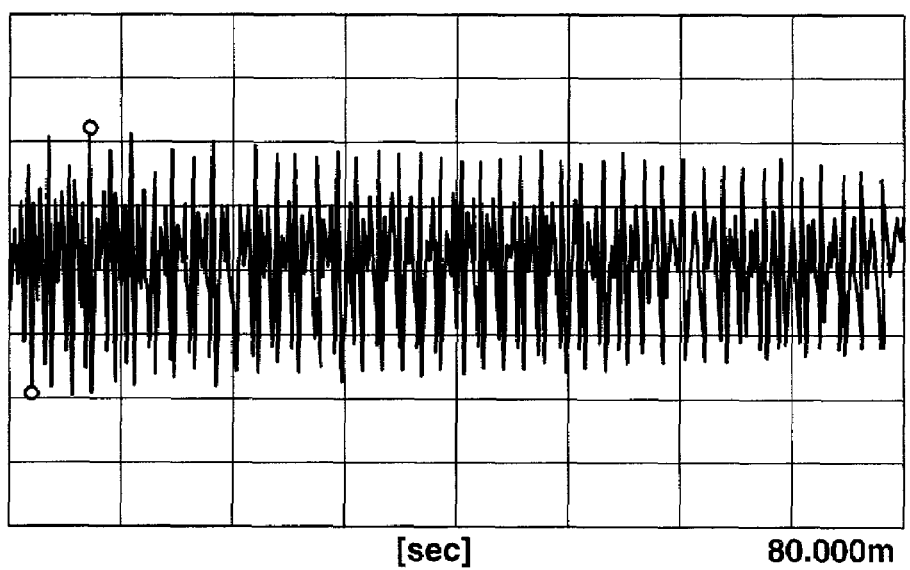
Figure 5A:
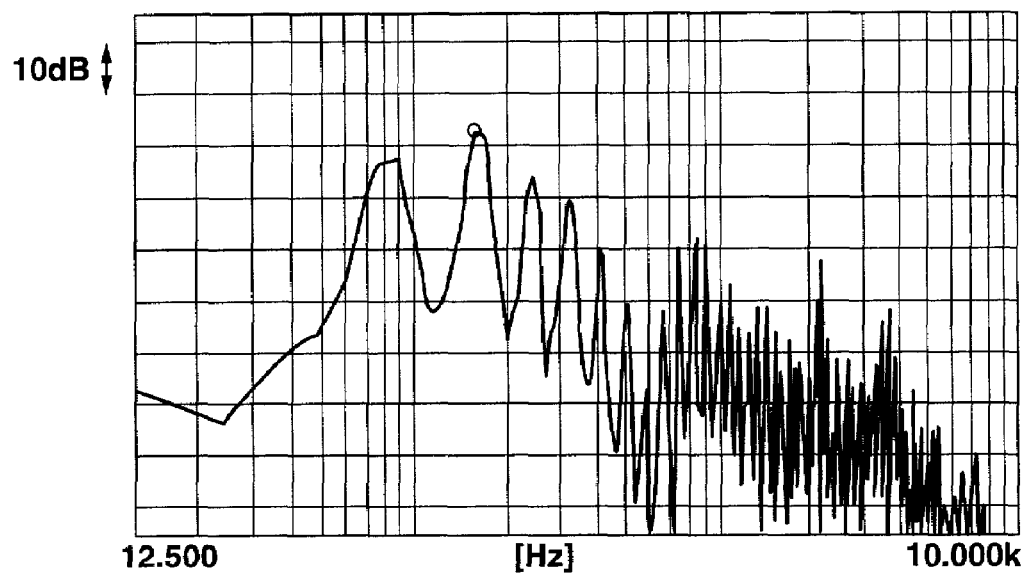
FIGS. 5A and 5B illustrate a typical frequency component distribution pattern and a temporal waveform of bass guitar.
Figure 5B:
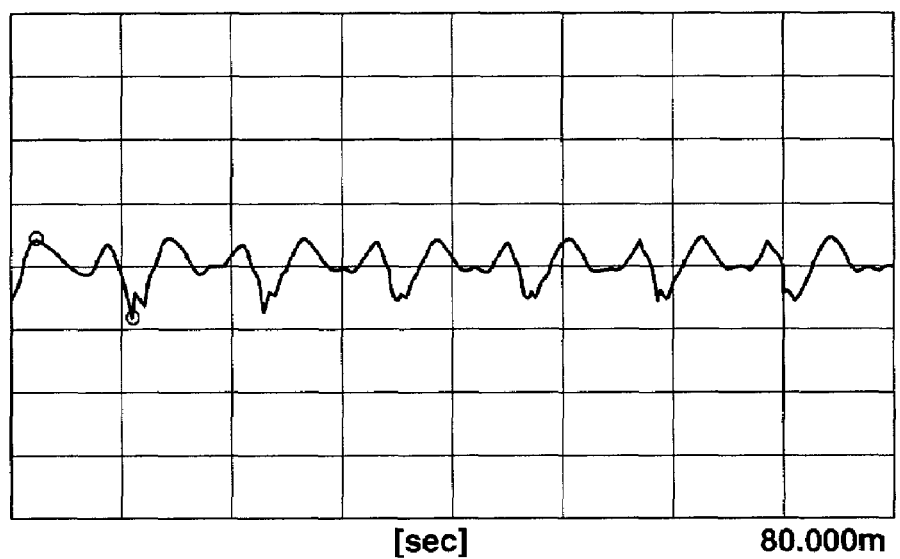

FIGS. 2A and 2B respectively illustrate a typical frequency component distribution pattern and a temporal waveform of man's voice, while FIGS. 3A and 3B respectively illustrate a typical frequency component distribution pattern and a temporal waveform of woman's voice. FIGS. 4A and 4B illustrate a typical frequency component distribution pattern and a temporal waveform of saxophone, while FIGS. 5A and 5B illustrate a typical frequency component distribution pattern and a temporal waveform of bass guitar.

While FIGS. 2A through 5B shows simple frequency component distribution patterns and temporal waveforms, other acoustic characteristics can also be found in most sounds in terms of pitch frequency, higher harmonic frequencies of pitch frequency, formant frequencies and so on.

Beside a frequency component distribution pattern, sound characteristic parameters such as a linear prediction coefficient and a residual signal thereof may also be used for the purpose of the invention.

It is also known that intonational parameters that are obtained as temporal fluctuations of pitch frequency can also effectively be used to characterize audio signals. Different situations can be identified from speeches of a same person on the basis of intonation. For instance, a person may speak at low pitch and low intonation when he of she is sad and/or distressed. Therefore, information on intonation may also be used as sound characteristic parameters for the purpose of the invention.

The sound characteristic parameters from the sound characteristic parameters analyzing section 21 are fed to similarity determining section 22, which similarity determining section 22 computationally determines the (degree of) similarity of each sound characteristic parameter of the audio signal operating as retrieving key (to be referred to as retrieving key sound characteristic parameter) and its counterpart of the audio signal to be scrutinized from the sound characteristic parameter analyzing section 21.

The operation of computationally determining the similarity of two sound characteristic parameters of the similarity determining section 22 is not a one based on the use of time series waveform patterns of sounds as in the case of voice recognition but that of computationally determining if some of the structural factors of the sound source such as the structure and the resonance system of a sound emitter are similar to their counterparts of the audio signal operating as retrieving key (to be referred to also as retrieving key audio signal). Such an operation of computationally determining the similarity of two sound characteristic parameters can be carried out if the audio signal is reproduced at high speed.

Now, assume three parameters (x, y, z) typically including a pitch frequency and a formant frequency are used as sound characteristic parameters for the operation of similarity determination.

Assume also that the retrieving key sound characteristic parameters of the audio signal operating as retrieving key are $(x0, y0, z0)$ during a time period TW and the corresponding sound s of the audio signal to be scrutinized are $(xi, yi, zi)$. Then, the similarity determining section 22 computationally determines the distance S separating them as similarity between them. The time period TW is selected in advance by taking the number and types of the parameters to be used and the time required for the operation of similarity determination into consideration:

$$S=\text{sqrt}\{(xi-x0)^2+(yi-y0)^2+(zi-z0)^2\}$$

where sqrt is the square of the value in the parenthesis.

It will be appreciated that the smaller the value of S, the greater the similarity of the two audio signals. In this embodiment, the similarity determining section 22 computationally determines the distance S for each preselected time period TW and judges that the audio signal to be scrutinized is similar to the audio signal operating as retrieving key for the time period TW when the computationally determined distance S is smaller than a predetermined value Sth but not similar to the latter when the determined S is not smaller than the predetermined value Sth.

Since the value of S itself represents the degree of similarity of the two audio signals, it is also feasible to directly output the distance S.

The output of the similarity determining section 22 on the judgment on the similarity of the two audio signals is then fed to display section 24 by way of display control section 23. The display control section 23 causes the display screen of the display section 24 to display the output of the similarity determining section 22 on the similarity judgment in terms of the time from the start of the audio signal to be scrutinized. More specifically, it may typically display a bar graph as shown in FIGS. 8A and 8B, which will be described hereinafter.

Now, the retrieving key of this embodiment will be described. In this embodiment, the audio signal to be used as retrieving key is extracted from the input audio signal or the reproduced audio signal and stored in advance in memory section 32.

The input audio signal obtained at the terminal b of the switching circuit SW1 is fed to input terminal f of switching circuit SW4 and the reproduced audio signal from the audio signal reproducing section 14 is fed to input terminal e of the switching circuit SW4, which switching circuit SW4 is adapted to extract the audio signal operating as retrieving key either from the input audio signal or from the reproduced audio signal and be changed over according to the instruction for selecting either of them input by the user by way of the key operating section 20 through a control signal from the control section 10.

The audio signal from the switching circuit SW4 is supplied to retrieving key audio signal extracting/storage section 31. The retrieving key audio signal extracting/storage section 31 is fed with a control signal from the control section 10 according to the key operation of the user at the key operating section 20.

The user of this embodiment listens to the reproduced output sound of the input audio signal or the reproduced audio signal coming from the loudspeaker and operates the retrieving key specifying key (not shown) of the key operating section 20 when the part that he or she wants to use as retrieving key comes. Then, the embodiment extracts a part of the audio signal corresponding to the predetermined time period TW including the time of the key operation and stores the part in the retrieving key memory 32, which retrieving key memory 32 has storage areas, each having a size corresponding to that of a retrieving key, so that retrieving keys are stored in respective storage areas.

The retrieving key audio signal extracting/storage section 31 has a buffer memory so that the time period TW starts slightly before the time of key operation. Then, the part of the audio signal corresponding to the time period TW specified by the user is stored in the retrieving key memory 32 as retrieving key audio signal.

The retrieving key memory 32 can store several retrieving keys and the retrieving key storage areas of the retrieving key memory 32 are updated by a control signal from the control section 10 each time when a new retrieving key audio signal is specified by the user. Thus, the retrieving key audio signal for the time period TW extracted from the retrieving key extracting/storage section 31 according to the instruction of the user is stored in a retrieving key storage area of the retrieving key memory 32 according to a switching control signal from the control section 10 in synchronism with the update of the retrieving key storage areas.

Although not illustrated, the retrieving key storage areas of the retrieving key memory 32 storing the respective retrieving key audio signals can also be input as memo input by way of the key operating section 20 and the memo input can be displayed on the display section 24 in the form of a table that shows the numbers allocated to the storage areas storing the retrieving key audio signals. Therefore, the user can use a desired retrieving key to retrieve an audio signal by specifying the number of the retrieving key storage area storing the retrieving key that he or she wants to use.

More specifically, as the user selects a retrieval mode and specifies the number of the retrieving key storage area storing the retrieving key audio signal he or she wants to use by way of the key operating section 20, the switching circuit SW6 is operated by a control signal from the control section 10 and the audio signal operating as retrieving key is read out of the specified retrieving key storage area of the retrieving key memory 32 by retrieving key audio signal reading section 33.

The read out retrieving key audio signal is then fed to and analyzed by retrieving key sound characteristic parameter analyzing section 34 to obtain a retrieving key sound characteristic parameter for the audio signal operating as retrieving key. The obtained retrieving key sound characteristic parameter is then fed to the above described similarity determining section 22 and used to retrieve the audio signal to be scrutinized for the predetermined time period TW.

Now, the operation of the audio signal retrieving device having the above described configuration will be discussed in detail.

[Registration of Retrieving Key]

Figure 6:
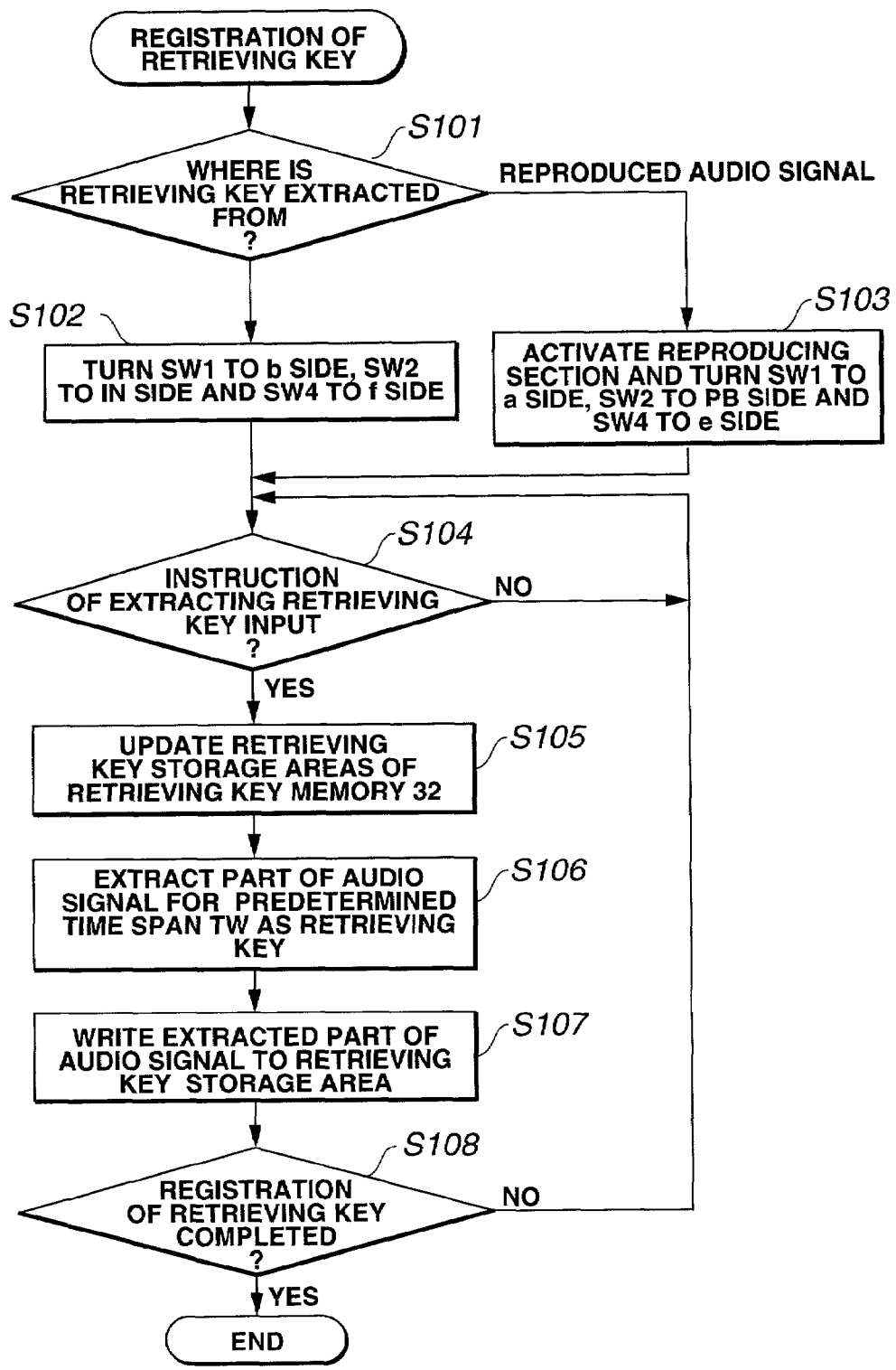
FIG. 6 is a flow chart of the operation of registering a retrieving key of the first embodiment.

In the case of the above described embodiment, each retrieving key is registered before it is used for an actual retrieving operation. As described above, each retrieving key is stored in the retrieving key memory 32 and registered as audio signal. FIG. 6 is a flow chart of the operation of registering a retrieving key where the control section 10 takes a major role. The processing routine of FIG. 6 is started when the user selects the retrieving key registration mode by way of the key operating section 20. Now, the operation of registering a retrieving key will be described by referring to FIG. 6.

Firstly, the control section 10 determines the mode selection of the user done by way of the key operating section 20. More specifically, it determines if the user selects the mode of extracting retrieving keys from an input audio signal or the mode of extracting retrieving keys from a reproduced audio signal (Step S101).

If it is determined that retrieving keys are to be extracted from the input audio signal, the control section 10 turns the switching circuits SW1, SW2 and SW4 respectively to the side of the output terminal b, to that of the input terminal IN and to that of the input terminal f (Step S102).

On the other hand, if it is determined that retrieving keys are to be extracted from the reproduced audio signal, the control section 10, turns the switching circuits SW1, SW2 and SW4 respectively to the side of the output terminal a, to that of the input terminal PB and to that of the input terminal e (Step S103).

After Step S102 or S103, the control section 10 proceeds to Step S104, where it waits for the instruction of the user given by way of the key operating section 20, specifying the part of the audio signal to be used as retrieving key. At the same time, the audio signal from which retrieving keys are to be extracted is fed to the loudspeaker 16 by way of the audio amplifier 15 and the original sound is reproduced from the loudspeaker 16 so that the user may input his or her instruction by way of the key operating section 20 to specify each part of the audio signal to be used as retrieving key, which may be part of a speech of a specific speaker of a conference.

Then, after detecting the instruction input by the user for extracting a part of the audio signal as retrieving key in Step S104, the control section 10 updates the retrieving key storage areas of the retrieving key memory 32 (Step S105) and controls the retrieving key audio signal extracting/storage section 31 to make it extract the part of the audio signal corresponding to a predetermined time period TW (Step S106). Then, the control section 10 controls the operation of writing the extracted part of the audio signal in an updated specific retrieving key storage area of the retrieving key memory 32 as retrieving key (Step S107).

Thereafter, the control section 10 determines if an instruction for ending the current mode of registering retrieving keys is given by the user by way of the key operating section 20 or not (Step S108). If such an instruction is given, the control section 20 terminates the processing routine of the mode of registering retrieving keys. If, on the other hand, such an instruction is not given, the control section 20 returns to Step S104, where it waits for another instruction of the user for extracting a retrieving key to repeat the above steps.

In this way, the audio signals extracted by the user from the input audio signal or the reproduced audio signal as retrieving keys can be registered and stored in the retrieving key memory 32. If the retrieving key memory 32 has a memory capacity sufficiently large for storing those new retrieving keys, the audio signals that are already stored in the memory as retrieving key need not to be erased and can remain there.

According to the invention, since the similarity of any two audio signals is computationally determined by using a sound characteristic parameter, each of the audio signals stored as retrieving keys in the retrieving key memory 32 can be used not only for retrieving parts of the original audio signal that resemble it but also for retrieving parts of any audio signals from which the retrieving keys are not extracted if such parts resemble it.

Therefore, in the case of the embodiment of FIG. 1, once the user stores in the retrieving key memory 32 audio signals that last for a predetermined time period TW and he or she wants to use as retrieving keys in order to scrutinize a specific sound source, the user can use them as retrieving keys anytime when he or she wants.

[Retrieving Operation]

Figure 7:
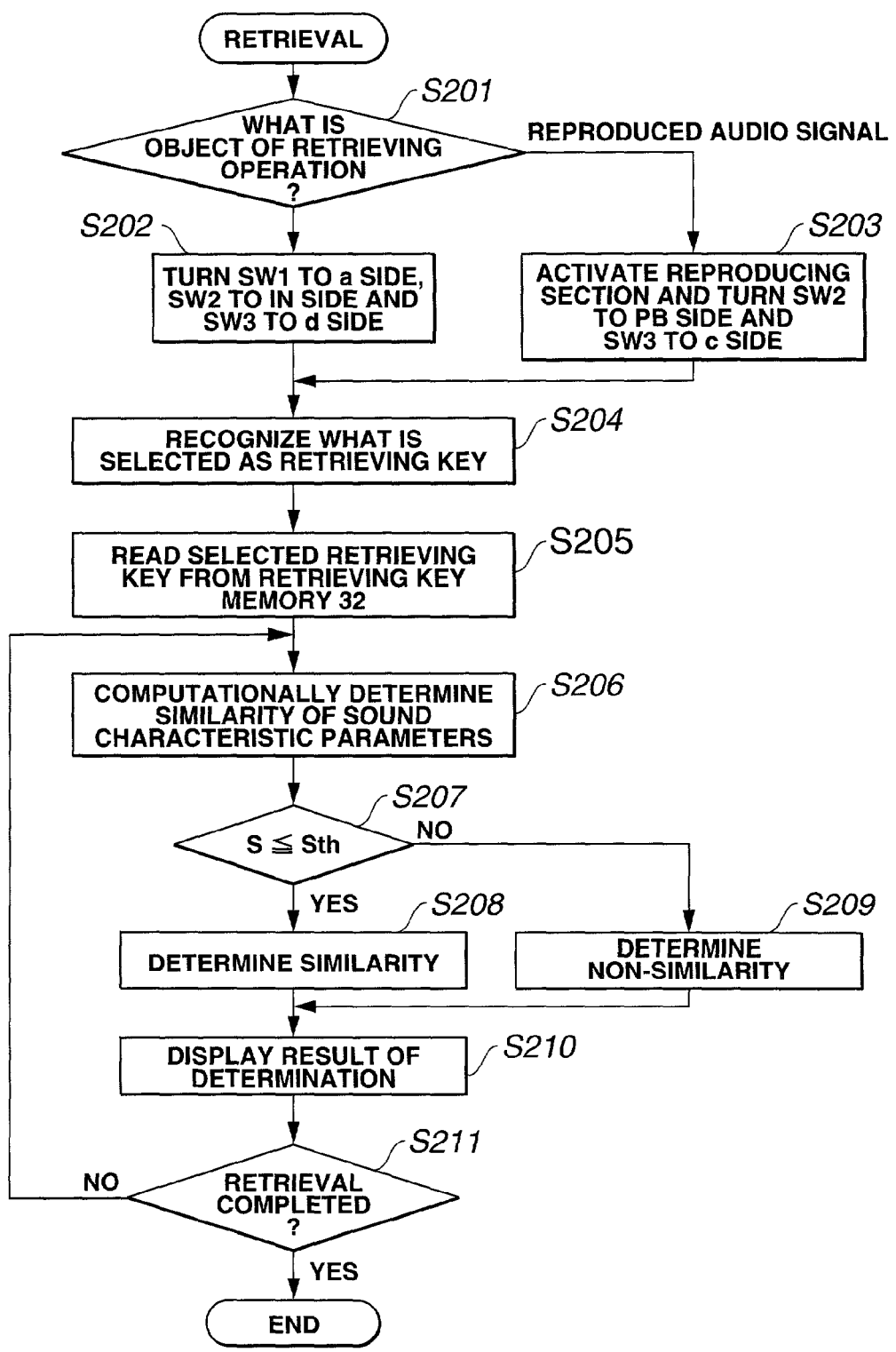
FIG. 7 is a flow chart of the retrieving operation of the first embodiment.

The audio signals stored in the retrieving key memory 32 as retrieving keys are used for a retrieving operation in a manner as described below. FIG. 7 schematically shows the processing routine for a retrieving operation. The processing routine of FIG. 7 is started when the user selects the retrieving operation mode by way of the key operating section 20. Now, the retrieving operation will be described by referring to FIG. 7.

Firstly, the control section 10 determines the mode selection of the user done by way of the key operating section 20. More specifically, it determines if the user selects the mode of a retrieving operation to be conducted on an input audio signal or the mode of retrieving operation to be conducted on a reproduced audio signal (Step S201).

If it is determined that a retrieving operation is to be conducted on the input audio signal, the control section 10 turns the switching circuits SW1, SW2 and SW3 respectively to the side of the output terminal a, to that of the input terminal IN and to that of the input terminal d (Step S202).

On the other hand, if it is determined that a retrieving operation is to be conducted on the reproduced audio signal, the control section 10, turns the switching circuits SW2 and SW3 respectively to the side of the input terminal PB and to that of the input terminal c (Step S203).

After Step S202 or S203, the control section 10 proceeds to Step S204, where it recognizes the audio signal selected as retrieving key by the user (Step S204) and controls the operation of the embodiment so as to read the audio signal selected as retrieving key from the retrieving key memory 32 (Step S205).

Then, the audio signal read out of the memory 32 as retrieving key is fed to the retrieving key sound characteristic parameter analyzing section 34 and then to the similarity determining section 22 as retrieving key sound characteristic parameter, which similarity determining section 22 computationally determines the similarity between the sound characteristic parameter of each time period TW of the audio signal to be scrutinized for similarity and the that of the sound characteristic parameter of the retrieving key fed to it (Step S206). As described above, the similarity is determined on the basis of the distance S between them in this instance.

Thus, it is determined if the distance S representing the degree of similarity is smaller than a predetermined threshold value Sth or not (Step S207) and the part of the original audio signal is determined to be resembling the retrieving key if the distance S is smaller than the predetermined threshold value Sth, (Step S208), whereas the part is determined to be not resembling the retrieving key if the distance S is not smaller than the threshold value Sth (Step S209). The result of the computational determination is then displayed on the display screen of the display section 24 by way of the display control section 23 (Step S210).

When the audio signal to be scrutinized is over or when an instruction for ending the retrieving operation is given by the user, the control section 10 determines if the retrieving operation is terminated or not (Step S211). If the operation is terminated, the processing routine is made to end. Otherwise, the control section 10 returns to Step S206 to continue the retrieving operation using retrieving keys.

FIGS. 8A and 8B schematically illustrate a result that can be obtained by an operation of retrieving audio signals according to the invention from the reproduced audio signal of an electronic audio record of a conference, where the retrieving key is selected from the speech of a specific speaker. In the case of FIGS. 8A and 8B, the time spans where the specific speaker is speaking can be identified in the entire audio record of the conference.

While only a single retrieving key is used in the above description of a retrieving operation, it may be needless to say that a plurality of retrieving keys can be specified and used for determining the degree of similarity between two speeches. If such is the case, it may be so arranged that the retrieving keys are sequentially used by switching from one to another by every tens of several milliseconds so that the similarity determining section 22 computationally determines the similarity of the two speeches on the basis of each of the retrieving keys.

Alternatively, a plurality of similarity determining sections may be provided and used simultaneously in parallel to computationally determine the similarity of the two speeches, using the respective retrieving keys.

FIG. 9 schematically a result that can be obtained when a plurality of retrieving keys are selected and used for a retrieving operation. In the case of FIG. 9, the time spans where three specific speakers A, B and C are speaking can be identified in the entire audio record of the conference.

Thus, with the above described embodiment, in a conference where a plurality of attendants are present, the parts of the speeches of all the speakers of the conference can be identified, sorted and displayed out of the entire electronic audio record of the conference if audio signals are registered in advance as retrieving keys for all the attendants of the conference.

The result of similarity determination is expressed in terms of binary values in the above description. In other words, similarity is determined on the basis if a predetermined threshold value is exceeded or not. However, similarity may be expressed in terms of the distance S separating two signal parts. The shorter the distance S is, the more two signal parts resemble each other. Then, the degree of similarity may be displayed by the degree of darkness of shading as shown in FIG. 8B. In FIG. 8B, the darker the shading is, the greater the degree of similarity. Alternatively, different colors may be used to display the degree of similarly.

If a plurality of retrieving keys are used, the result of similarity determination may be displayed by using a specific color for each retrieving key and the degree of similarity may be displayed by changing the degree of density of the color.

Note that the result of similarity determination is output and displayed on the display screen of the display section as a function of the elapsed time from the beginning of the audio signal to be scrutinized in the above description. On the other hand, if the audio signal to be scrutinized is a reproduced audio signal, the position of the audio signal on the recording medium 13 that corresponds to a given elapsed time can be easily known. Therefore, when the output of a similarity determining operation is obtained for a time span of the reproduced audio signal, the position of the audio signal that is being currently reproduced can be displayed typically by means of a replay position indicator cursor along with the result of similarity determination for that time span as shown in FIG. 10.

Inversely, it is possible to start reproducing the audio signal to be scrutinized form the replay position indicating cursor as shown in FIG. 10, if it is so arranged that the user can specify the starting position of the cursor. Then, it is also possible to extract the part of the audio signal sorted by means of a retrieving key and reproduce it simultaneously.

Since a sound characteristic parameter is used to computationally determine the similarity of part of a audio signal to be scrutinized and the audio signal to be used as retrieving key according to the invention, the operation of similarity determination can be carried out successfully if the audio signal to be reproduced for scrutiny is replayed not at proper speed but at double or triple speed because the waveform of the audio signal is not used on a time series basis unlike the case of voice recognition where the similarity of two waveform patterns is checked in a processing operation conducted for pattern matching.

Therefore, according to the invention, the similarity determining operation may be conducted while reproducing the audio signal at high speed and, when a part that resembles the retrieving key being used is detected, that part may be reproduced at proper speed so that only the part resembling the retrieving key may be extracted and reproduced to the user.

Additionally, since the result of a retrieving operation can be made to correspond to a specific address on the recording medium after the retrieving operation, it is also possible to extract only the parts of the original audio signal that resemble a specific retrieving key and reproduce the extracted parts on the basis of the retrieving operation.

While the above advantages of the present invention are pointed out in terms of a reproduced audio signal, it is also possible according to the invention to retrieve parts of an input audio signal that resemble a specific retrieving key that is registered in advance. With this arrangement, parts of an input audio signal can be sorted by using a number of retrieving keys. For examples, audio signals of a plurality of instruments may be registered in advance as retrieving keys so that an input audio signal may be divided into parts and the parts may be sorted out and displayed for each and every instrument.

While retrieving keys are extracted out of an input audio signal or a reproduced audio signal and stored in the retrieving key memory 32 in the above description of the first embodiment, it may be so arranged that a plurality of audio signals are stored in advance in the retrieving key memory 32 to form a retrieving key library.

While the similarity determining operation is conducted on the basis of the geometrical distance S of any two sound characteristic parameters in the above description, it may alternatively be so arranged that a new parameter is determined on the basis of several known parameters and the distance between any two sound characteristic parameters is determined by using the newly determined parameter.

For instance, if three sound characteristic parameters of x, y and z are used to determine a new parameter k by using a formula of $$k=ay+bz,$$

the distance of a sound characteristic parameter of the audio signal to be scrutinized and that of a retrieving key may be determined by using two parameters (x, k), or the parameter x and the new parameter k. Additionally, each sound characteristic parameters may be weighted and the similarity of any two parts of audio signals may be determined by giving priority to heavily weighted parameters.

The retrieving key memory 32 may be a memory contained in the embodiment or a removable memory that is realized typically in the form of a memory card. If a memory card is used as retrieving key memory 32, a plurality of memory cards may be used to store a plurality of types of retrieving keys so that an appropriate one containing retrieving keys effective for scrutinizing a specific audio signal may be selected for use.

Additionally, it may be so arranged that a sound source for an audio signal to be used as retrieving key may be provided and an audio signal is input from the sound source by way of the input terminal 11 and stored in the retrieving key memory 32 in advance. Alternatively, an audio signal may be input from the sound source and temporarily stored in a buffer memory as retrieving key each time when an audio signal is scrutinized. Then, it is no longer necessary to use the retrieving key memory 32.

A retrieving key is not limited to an audio signal from a single sound source. As described earlier, it may be an audio signal extracted for a specific time span from an input audio signal or a reproduced audio signal.

If an audio signal that is accompanied by an image is involved, the image may also be displayed on the display screen of the display section. The use of images will facilitate the operation of sorting the result of a retrieving operation. For instance, a recorded video signal may be scrutinized and sorted by using audio signals.

2nd Embodiment

Figure 11:
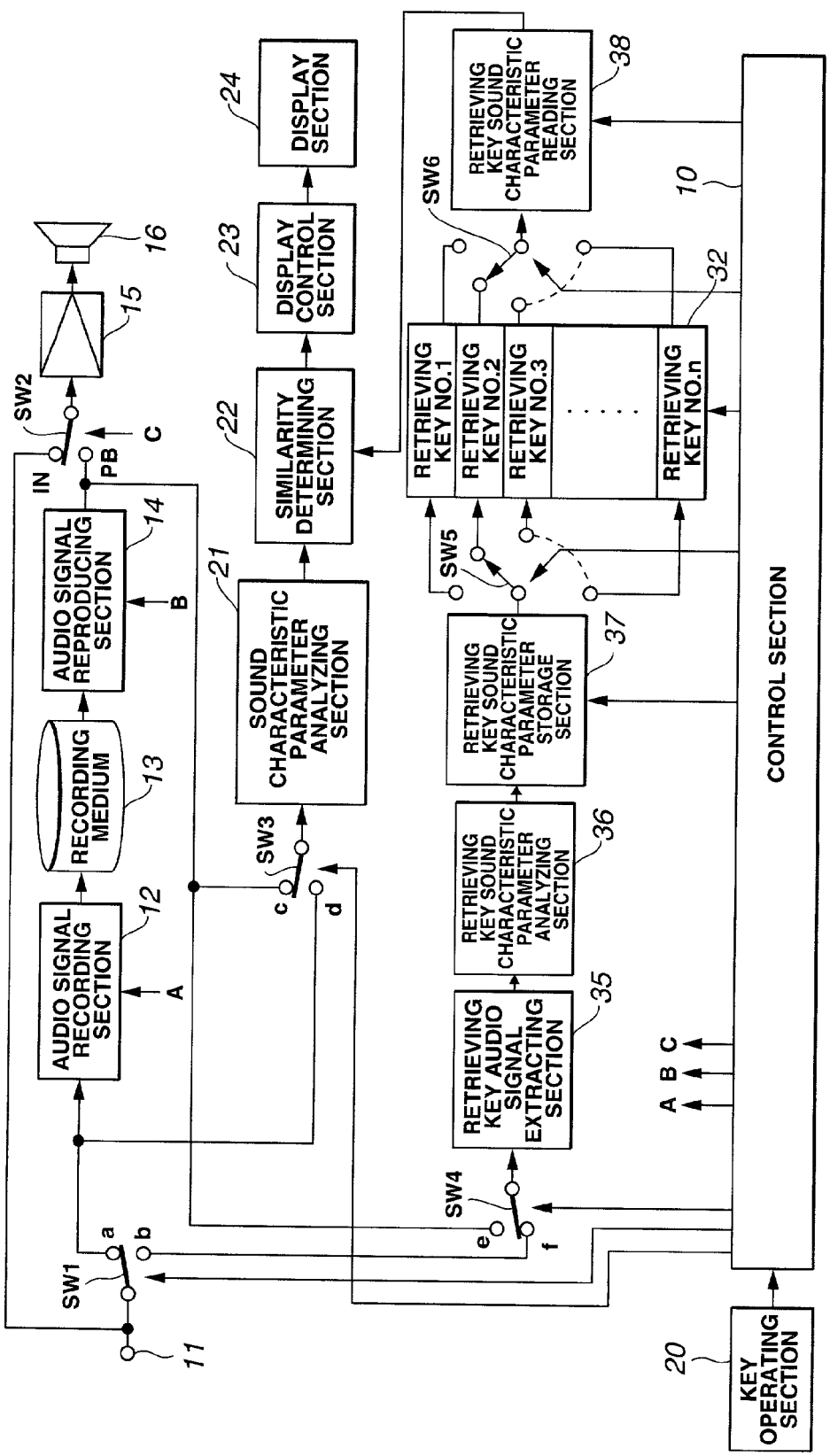
FIG. 11 is a schematic block diagram of a second embodiment of sound retrieving device according to the invention.

FIG. 11 is a schematic block diagram of a second embodiment of audio signal retrieving device according to the invention. While the above described first embodiment is adapted to store audio signals as registered retrieving keys, the second embodiment is adapted to store sound characteristic parameters in the retrieving key memory 32 as registered retrieving keys. Otherwise, the second embodiment has a configuration same as the first embodiment and, therefore, the components of this embodiment that are same as those of the first embodiment are denoted respectively by the same reference symbols.

The second embodiment comprises a retrieving key audio signal extracting section 35 arranged at the output side of the switching circuit SW4. This retrieving key audio signal extracting section 35 corresponds to the part of the retrieving key audio signal extracting/storage section 31 that is adapted to extract the part of an audio signal specified by the user as retrieving key.

The retrieving key audio signal extracted by the retrieving key audio signal extracting section 35 is analyzed by retrieving key sound characteristic parameter analyzing section 36 to obtain a sound characteristic parameter for the audio signal, which sound characteristic parameter is then stored in retrieving key sound characteristic parameter storage section 37 and also in the retrieving key memory 32 by way of switching circuit SW5. It may be appreciated that the retrieving key sound characteristic parameter storage section 37 corresponds to the means for storing the parts of a audio signal extracted as retrieving keys of the retrieving key extracting/storage section 31 of FIG. 1 and stores retrieving key sound characteristic parameters in place of audio signal to be used as retrieving keys. Thus, retrieving keys (which are sound characteristic parameters in this embodiment) are stored in respective retrieving key storage areas of the retrieving key memory 32.

Any of the sound characteristic parameters stored in the retrieving key memory 32 and operating as retrieving keys is read out by switching circuit SW6 and retrieving key sound characteristic parameter reading section 38 according to a control signal from the control section 10 that is generated according to an instruction input by the user by way of the key operating section 20. Since a sound characteristic parameter is read out from the retrieving key memory 32 in the case of the second embodiment, it is directly fed to the similarity determining section 22 and used for the computational operation of determining the similarity of the audio signal operating as retrieving key and the part of the an audio signal to be scrutinized.

As seen from the above description, the second embodiment differs from the first embodiment only in that the retrieving key memory 32 stores retrieving key sound characteristic parameters in place of audio signals, whereas the operation of registering retrieving keys and the retrieving operation using retrieving keys are same as those of the first embodiment. Therefore, the second embodiment provides advantages same as those described above by referring to the first embodiment. Additionally, the second embodiment can be modified in various different ways in a manner as described above by referring to the first embodiment.

Finally, since the retrieving key memory 32 stores not audio signals but retrieving key sound characteristic parameters as retrieving keys in the second embodiment, the storage capacity of the retrieving key memory of this embodiment required for storing a retrieving key is smaller than that of the retrieving key memory of the first embodiment. In other words, a greater number of retrieving keys can be stored in this embodiment.

3rd Embodiment

A third embodiment of the invention is characterized in that it uses sound characteristic parameters that can be used to synthetically reproduce audio signals. Because sound characteristic parameters can be used to synthetically reproduce audio signals, audio signals can be recorded in the form of sound characteristic parameters. Thus, as in the second embodiment, sound characteristic parameters are stored as retrieving keys in the retrieving key storage 32 of this third embodiment.

Figure 12:
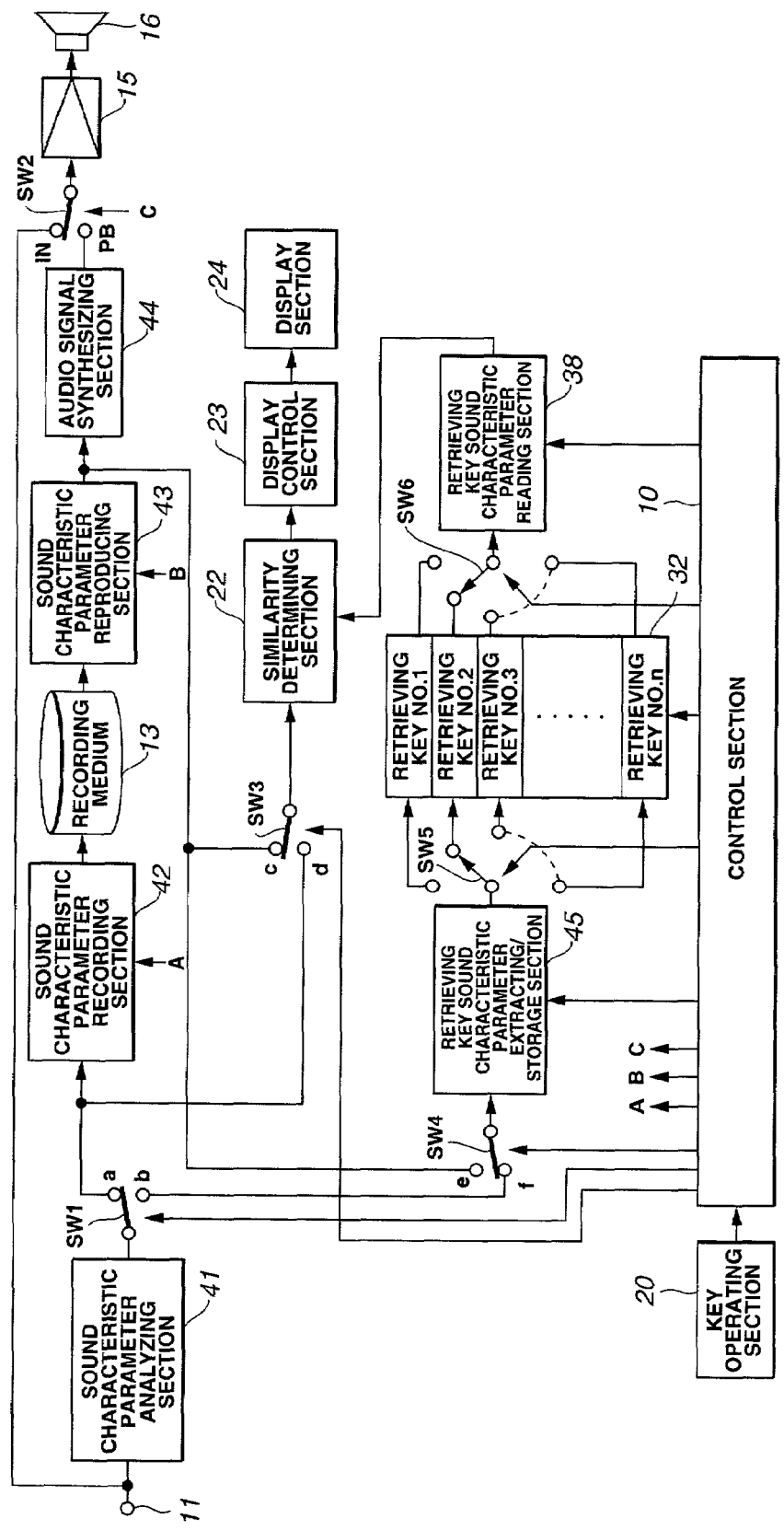
FIG. 12 is a schematic block diagram of a third embodiment of sound retrieving device according to the invention.

FIG. 12 is a schematic block diagram of the third embodiment of audio signal retrieving device according to the invention. In FIG. 12, the components of this embodiment that are same as those of the preceding embodiments are denoted respectively by the same reference symbols. In this third embodiment, parameters of a vocoder may typically be used as sound characteristic parameters.

As shown in FIG. 12, an input audio signal is fed to sound characteristic parameter analyzing section 41 by way of the input terminal 11 and analyzed typically for sound characteristic parameters of a vocoder system. The sound characteristic parameters of the input audio signal from the sound characteristic parameter analyzing section 41 are then fed to sound characteristic parameter recording section 42 by way of the switching circuit SW1, which sound characteristic parameter recording section 42 records the sound characteristic parameters fed to it on a recording medium 13 under the control of the control section 10.

The sound characteristic parameters of the input audio signal recorded on the recording medium 13 are reproduced by sound characteristic parameter reproducing section 43 under the control of the control section 10 and fed to audio signal synthesizing section 44, which audio signal synthesizing section 44 synthetically reproduce the original audio signal by using the sound characteristic parameters.

The reproduced audio signal obtained by audio signal synthesizing section 44 is then fed to the loudspeaker 16 by way of the input terminal side PB of the switching circuit SW2 and the audio amplifier 15 and the original sound is reproduced from the loudspeaker 16. It may be appreciated that the process where the input audio signal coming in through the input terminal 11 is fed to the loudspeaker 16 by way of the input terminal side IN of the switching circuit SW2 and the audio amplifier 15 to reproduce the original sound is same as its counterparts of the first and second embodiments.

In this third embodiment, no sound characteristic parameter analyzing section 21 is provided and the switching circuit SW3 is adapted to select either the sound characteristic parameter of the input audio signal coming through the output terminal side a of the switching circuit SW1 or the sound characteristic parameter of the reproduced audio signal coming through the sound characteristic parameter reproducing section 43 by means of a switching control signal generated by the control section 10 according to the instruction given by the user by way of the key operating section 20 and supplies it to the similarity determining section 22.

On the other hand, retrieving key sound characteristic parameters are stored in the retrieving key memory 32 of this third embodiment as retrieving keys as in the case of the second embodiment. Therefore, with this third embodiment, the sound characteristic parameter coming from the sound characteristic parameter analyzing section 41 is fed to one of the input terminals, or input terminal f, of the switching circuit SW4 by way of the output terminal side b of the switching circuit SW1, whereas the sound characteristic parameter coming from the sound characteristic parameter reproducing section 43 is fed to the other input terminal, or input terminal e, of the switching circuit SW4.

Then, the switching circuit SW4 is turned either to the side of the input terminal e or to that of the input terminal f according to the switching control signal from the control section 10 indicating if a sound characteristic parameter is to be extracted from the input audio signal or from the reproduced audio signal.

Then, the sound characteristic parameter from the switching circuit SW4 is fed to retrieving key sound characteristic parameter extracting/storage section 45. As in the case of the first embodiment, the user operates the retrieving key specifying key (not shown) of the key operating section 20 when the part that he or she wants to use as retrieving key comes. Then, retrieving key sound characteristic parameter extracting/storage section 45 of the embodiment extracts a part of the audio signal corresponding to the predetermined time period TW including the time of the key operation and stores the part in the retrieving key memory 32.

Thus, the retrieving key memory 32 stores the sound characteristic parameter of the audio signal extracted either from the input audio signal or from the reproduced audio signal as retrieving key. As in the case of the second embodiment, any of the retrieving key sound characteristic parameters stored in the retrieving key memory 32 that is specified by the user is read out by the retrieving key sound characteristic parameter reading section 38 and fed to the similarity determining section 22.

The operation of registering and retrieving a retrieving key is same as that of the first and second embodiments and hence will not be described here any further. Thus, except that the retrieving key memory 32 stores retrieving key sound characteristic parameters, the operation of registering and retrieving a retrieving key of the third embodiment is same as that of the first and second embodiments. Therefore, the third embodiment provides advantages same as those described above by referring to the first and second embodiments. Additionally, the third embodiment can be modified in various different ways in a manner as described above by referring to the first and second embodiments.

Still additionally, in the case of this third embodiment, since sound characteristic parameters are stored in a recording medium in place of audio signals, the memory capacity of the recording medium can be effectively exploited. Furthermore, since a same sound characteristic parameter analyzing section of the third embodiment can be commonly used for both the audio signal to be scrutinized and the audio signal to be used as retrieving key so that the third embodiment can be made to show a configuration that is more simple than the first and second embodiments.

Specific examples of synthetically reproducible sound characteristic parameters that can be used for the purpose of the invention include audio data of an audio compression system (MPEG Audio Layer I, Layer II, Layer III) conforming to the MPEG (Moving Picture Experts Group) Standards and those of the ATRAC (Adaptive Transform Acoustic Coding) system.

According to the MPEG audio Standards and the ATRAC system, the audio band is divided into a plurality of subbands for encoding in order to efficiently utilize the psychologic characteristics of the hearing sense of human. For instance, in the case of the MPEG Audio Layer I, the entire band of an audio signal is divided into 32 subbands having a same frequency width and each of the obtained signals is sampled with a sampling frequency of 1/32 for encoding.

Therefore, when a data of an audio compression system conforming to the MPEG Standards or a data of the ATRAC system (audio compressed/encoded data) is scrutinized, operations such as determining the band level distribution and the main band frequency and detecting the harmonic structure and the change with time of the main band frequency are conducted by using the subband data and retrieving key sound characteristic parameters are obtained on the basis of those operations.

When a technique of using data of an audio compression system conforming to the MPEG (Moving Picture Experts Group) Standards or those of the ATRAC system is applied to the embodiment of FIG. 12 and the input audio signal entering it through the input terminal 11 is an analog signal or a linear PCM signal, the sound characteristic parameter analyzing section 41 generates a data of an audio compression system conforming to the MPEG Standards or the ATRAC system. Then, the recording section 42 records the data of the audio compression system on the recording medium 13.

Then, the retrieving key sound characteristic parameter extracting/storage section 45 generates a subband data from the data of the audio compression system from the sound characteristic parameter analyzing section 41 or the sound characteristic parameter reproducing section 43 and carries out operations such as determining the band level distribution and the main band frequency and detecting the harmonic structure and the change with time of the main band frequency as described above. Then, the result of those operations are stored in the retrieving key memory 32 as retrieving key sound characteristic parameters.

As in the case of FIG. 1 and FIG. 11, a sound characteristic parameter analyzing section is provided upstream relative to the similarity determining section 22 and a subband data is generated from the data of the audio compression system from the switch SW1 or the sound characteristic parameter reproducing section 43. Then, operations such as determining the band level distribution and the main band frequency and detecting the harmonic structure and the change with time of the main band frequency are conducted on the subband data. With this arrangement, the sound characteristic parameter analyzing section may have a simple configuration. The similarity determining section 22 then compares the sound characteristic parameter obtained as a result of the analysis and the retrieving key sound characteristic parameter from the retrieving key sound characteristic parameter reading section 38 and determines the level of similarity between them.

While the input audio signal entered through the input terminal 11 is an analog signal or a linear PCM signal in the above description, a data of an audio compression system conforming to the MPEG Standards or the ATRAC system can be obtained if a serial digital data input through an interface conforming to the IEEE (Institute of Electrical and Electronic Engineers, Inc.) 1394 Standards or a digital audio compressed signal received by a digital broadcast receiving set is input so that the sound characteristic parameter analyzing section 41 of FIG. 12 is not required.

The above described method of analyzing an audio compressed signal for retrieving a sound characteristic parameter can minimize the delay of the retrieving operation and also the amount of arithmetic operations if compared with the case where a data of a digital audio compression system is decoded to obtain a linear PCM audio signal before the analysis.

4th Embodiment

While sound characteristic parameters are recorded on a recording medium in place of audio signals in the above described third embodiment, audio signals and corresponding sound characteristic parameters are mutually concomitantly recorded on a recording medium in the fourth embodiment of the invention. Since both audio signals and sound characteristic parameters are recorded in this fourth embodiment, sound characteristic parameters that can be recorded in the fourth embodiment are not limited to those that can be used to synthetically reproduce audio signals.

In the fourth embodiment, sound characteristic parameters are recorded on a recording medium such as a magnetic disk, a magneto-optical disk, an optical disk or a memory card concomitantly relative to audio signals. In other words, audio signals and sound characteristic parameters are recorded on a recording medium by the recording unit of audio signal (such as pack, packet or sector) and the data of a recording unit of audio signal and the corresponding sound characteristic parameter of the unit are linked in terms of recording area in the recording medium in such a way that their mutual correspondence may be clearly visible. For instance, they may be recorded in adjacent recording areas of the recording medium.

Figure 13:
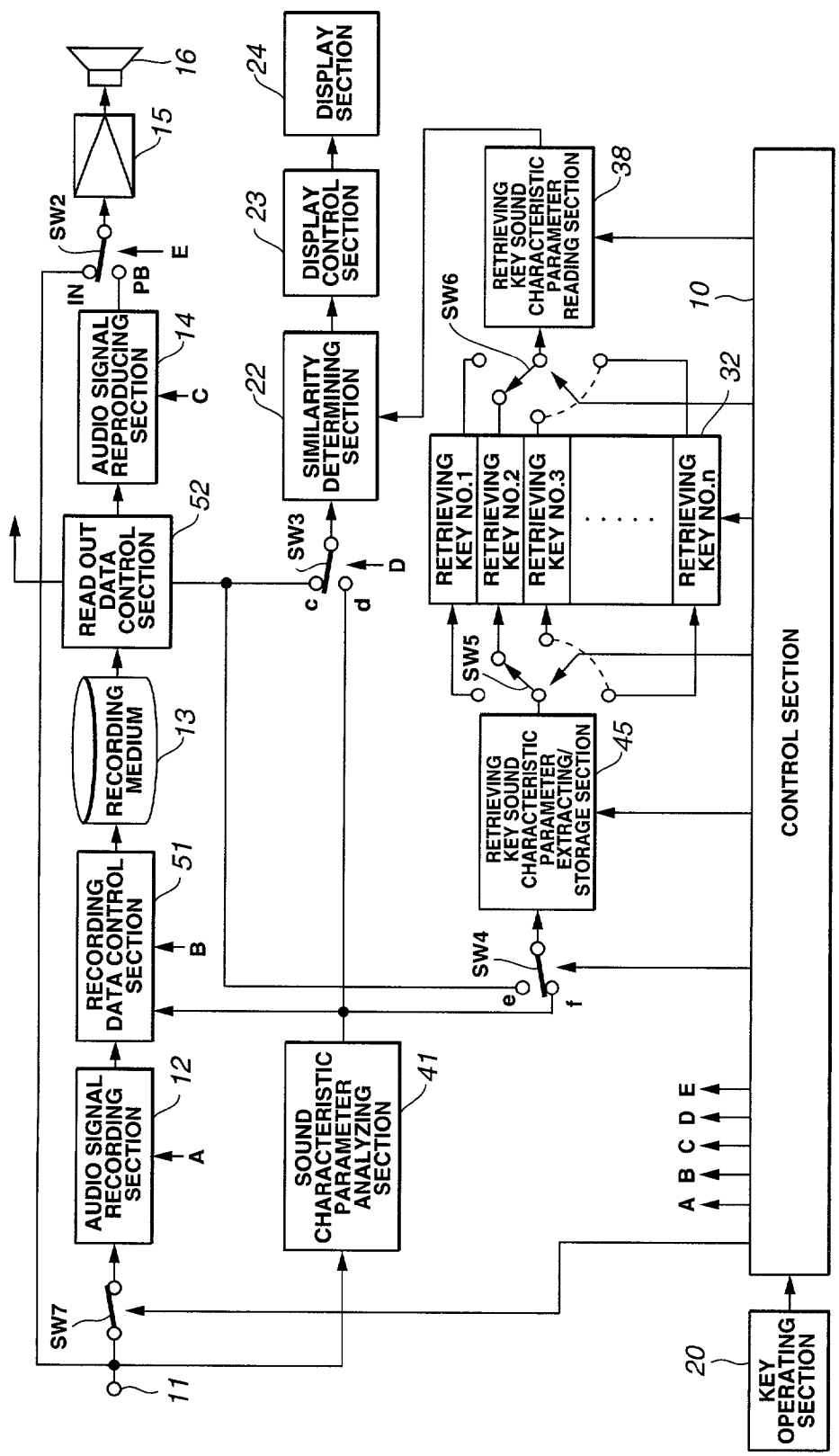
FIG. 13 is a schematic block diagram of a fourth embodiment of sound retrieving device according to the invention.

FIG. 13 is a schematic block diagram of the fourth embodiment of audio signal retrieving device according to the invention. In FIG. 13, the components of this embodiment that are same as those of the preceding embodiments are denoted respectively by the same reference symbols and will not be described any further.

In this fourth embodiment, the input audio signal entered through the audio input terminal 11 is fed to the audio signal recording section 12 by way of switching circuit SW7. The switching circuit SW7 is turned on for a recording operation by a switching control signal from the control section 10. Then, the input audio signal supplied to the audio signal recording section 12 is further fed to data recording control section 51 of the fourth embodiment.

The input audio signal entered through the input terminal 11 is also fed to the sound characteristic parameter analyzing section 41 and analyzed to obtain a sound characteristic parameter. The sound characteristic parameter from the sound characteristic parameter analyzing section 41 is fed to the input terminal of the switching circuit SW3 as sound characteristic parameter of the input audio signal that is to be scrutinized and also to the input terminal f of the switching circuit SW4 for the purpose of extracting a sound characteristic parameter from the input audio signal as retrieving key. Furthermore, the sound characteristic parameter from the sound characteristic parameter analyzing section 41 is fed to the data recording control section 51.

In a recording operation, the data recording control section 51 records the audio signal and the corresponding sound characteristic parameter in a predetermined recording format in such a way that their mutual correspondence may be clearly visible under the control of the control section 10. In this instance, as described above, the data recording control section 51 records the audio signal on recording medium 13 by the recording unit of audio signal and also the corresponding sound characteristic parameter of the unit at a position of the recording medium 13 located adjacent to the audio signal.

The input audio signal and the corresponding sound characteristic parameter recorded on the recording medium 13 in the above described recording format are thereafter reproduced by data reading control section 52 under the control of the control section 10. The audio signal reproduced from the recording medium 13 by the data reading control section 52 is then fed to the audio signal reproducing section 14 and then further to the loudspeaker 16 by way of the input terminal side PB of the switching circuit SW2 and the audio amplifier 15 so that the original sound is reproduced from the loudspeaker 16.

On the other hand, the corresponding sound characteristic parameter reproduced by the data reading control section 52 from the recording medium 13 is then fed to the input terminal c of the switching circuit SW3 as the sound characteristic parameter of the reproduced audio signal that is to be scrutinized and also to the input terminal e of the switching circuit SW4 for the purpose of extracting a sound characteristic parameter from the reproduced audio signal as retrieving key.

Furthermore, the audio signal and the sound characteristic parameter reproduced by the data reading control section 52 from the recording medium 13 can be fed to the outside by way of an external output terminal (not shown) for the purpose of a retrieving operation to be conducted on the audio signal by some other device. In other words, the other device is not required to be provided with a sound characteristic parameter analyzing section in order to prepare sound characteristic parameters.

Thus, this fourth embodiment from the preceding embodiments in that an input audio signal and the corresponding sound characteristic parameter are linked when recorded on a recording medium by the data recording control section 51 and both the audio signal and the corresponding sound characteristic parameter are reproduced by the data reading control section 52. However, this embodiment operates like the third embodiment in that sound characteristic parameters are used for retrieving operations and retrieving key sound characteristic parameters can be extracted from input audio signals and reproduced audio signals.

Therefore, the fourth embodiment provides advantages same as those described above by referring to the first embodiment. Additionally, the fourth embodiment can be modified in various different ways in a manner as described above by referring to the first embodiment.

Still additionally, as in the case of the third embodiment, since a same sound characteristic parameter analyzing section of the fourth embodiment can be commonly used for both the audio signal to be scrutinized and the audio signal to be used as retrieving key so that the third embodiment can be made to show a configuration that is more simple than the first and second embodiments. Furthermore, sound characteristic parameters can be fed to some other retrieving device and hence the other device is not required to be provided with a sound characteristic parameter analyzing section in order to prepare sound characteristic parameters.

Note that the audio signal to be recorded and the corresponding sound characteristic parameter can be linked together and recorded on a recording medium if they are not recorded adjacently relative to each other. For instance, the recording medium may be provided with a recording area for recording audio signals and a recording area for recording sound characteristic parameters and an audio signal and the corresponding sound characteristic parameter may be recorded at respectively positions of the recording areas that are linked to each other in terms of addresses. Alternatively, link information for linking the audio signal and the corresponding sound characteristic parameter may be additionally recorded so that they may be reproduced together by using the link information.

5th Embodiment

As described above, according to the invention, it is possible to carry out a retrieving operation on an audio signal to be scrutinized by determining the similarity of the audio signal to be scrutinized and an audio signal operating as retrieving key, using a sound characteristic parameter. Therefore, it is now possible to record the audio signal to be scrutinized while analyzing the audio signal by using the specified retrieving key. Thus, the result of the retrieving operation conducted on the audio signal to be scrutinized by using the retrieving key becomes available by the time when the recording operation is over. Therefore, it is possible to record the result of the retrieving operation on the recording medium in an area separated from the area where the audio signal is recorded.

The result of a retrieving operation conducted on a reproduced audio signal can also be recorded on the recording medium sometime later by providing the recording medium with an area separated from the area where the audio signal is recorded.

In view of the above advantages, with the fifth embodiment of the invention, the result of a retrieving operation conducted on an audio signal to be scrutinized is also recorded on a recording medium.

More specifically, with the fifth embodiment of the invention, one or more than one of the retrieving keys that are registered in advance are used to analyze the input audio signal to be recorded during the operation of recording the audio signal.

For example, a disk-shaped recording medium such as a magnetic disk, an optical or a magneto-optical disk or a memory card is used for the recording medium 13. Then, an audio signal is recorded on the recording medium, while the addresses of the recording medium are being monitored. With the fifth embodiment, the address (the storage position) of every part of the audio signal that are determined to be similar to the audio signal operating as retrieving key is recorded along with the identifying information of the retrieving key. The switching control signal (corresponding to the storage area of the retrieving key, or the number of the retrieving key) of the switching circuit SW6 is typically used as identifying information of the retrieving key.

FIG. 14 is a table showing the result of a retrieving operation obtained after the end of the operation of recording and scrutinizing the audio signal in the fifth embodiment. The table is used as retrieving index table for the audio signal recorded on the recording medium.

Referring to FIG. 14, the names of the retrieving keys are given to them in advance at the time of registration and, if the audio signal represents the speeches and the discussions of a conference, they may typically be the names of the attendants/speakers. The time span data is a data on each time span where the corresponding part of the audio signal resembles the specific retrieving key used for the retrieving operation. Each time span is defined by the start address ST and the end address ED. In FIG. 14, ADRi (i represents an integer) represents an address value on the recording medium.

Thus, with the fifth embodiment, the information of the retrieving index table is recorded in the preselected recording area on the recording medium that is separated from area of the recorded audio signal.

With the fifth embodiment, a part of the audio signal that resembles a specific retrieving key can be extracted and reproduced (retrieving/reproducing operation) with ease by using the retrieving index table.

Figure 15:
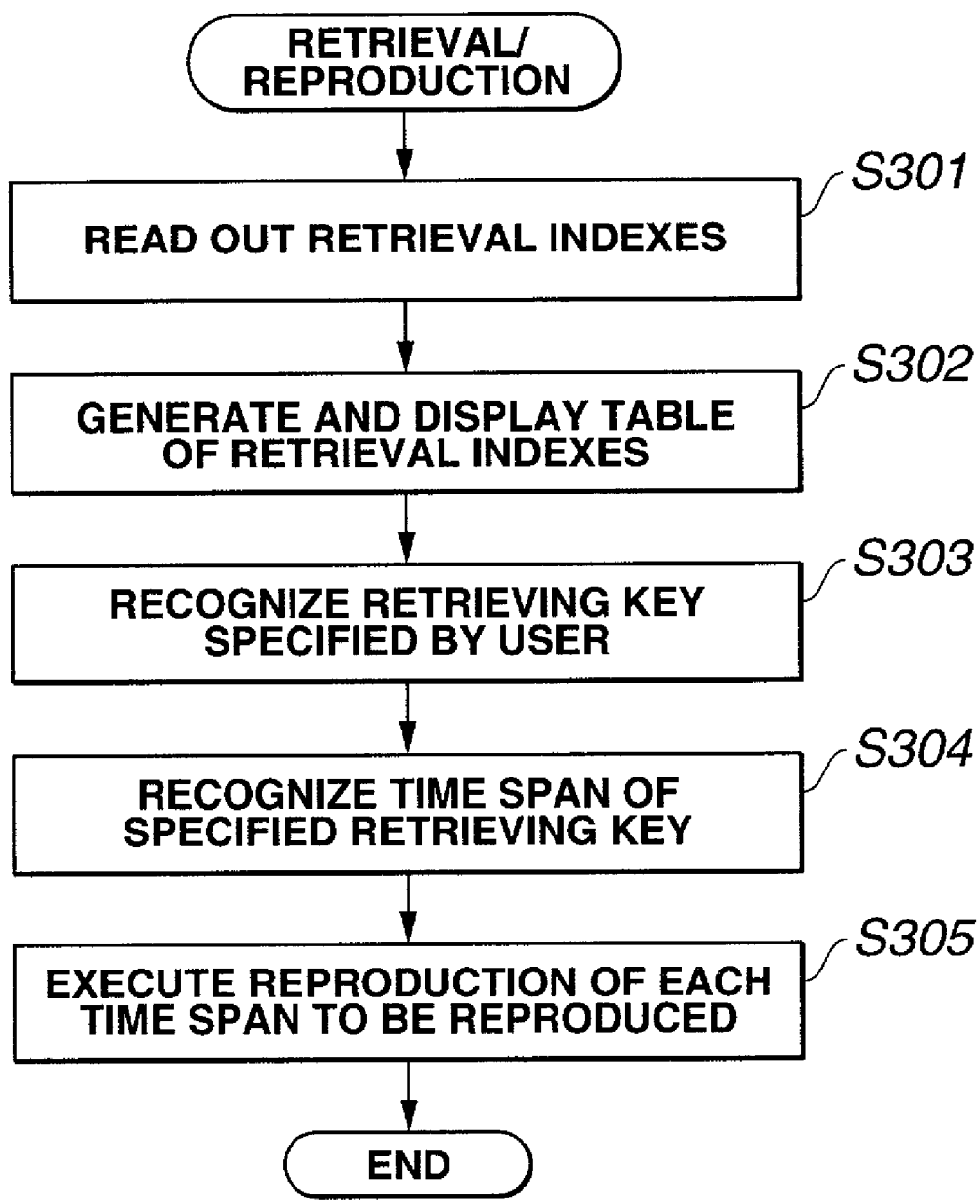
FIG. 15 is a flow chart of the operation of a principal part of the fifth embodiment of sound retrieving device according to the invention.

FIG. 15 schematically shows the processing routine for a retrieving/reproducing operation of the fifth embodiment. The processing routine of FIG. 15 is started when the user issues an instruction for a retrieving/reproducing operation by way of the key operating section 20.

Firstly, index data to be used for the retrieving operation is read out of the recording medium in order to prepare a retrieving index table (Step S301). The control section 10 prepares a retrieving index table as shown in FIG. 14 on the basis of the read out data and displays it on the display screen (Step S302).

Then, the user inputs the retrieving key he or she want to use for the retrieving/reproducing operation by way of the key operating section, consulting to the displayed retrieving index table. The control section 10 recognizes the retrieving key specified by the user (Step S303). It then recognizes the data of the time span of each part of the audio signal that is determined to be resembling the retrieving key by referring to the retrieving index table (Step S304). Then, the control section 10 sequentially reads the parts of the audio signal with the addresses indicated by the data of the recognized time spans (Step S305).

Thus, with the fifth embodiment, the parts of the audio signal that resembles a specified retrieving key can be extracted and reproduced with ease. It may be appreciated that, with the fifth embodiment, it is also possible to specify a retrieving key that is not listed on the retrieving index table out of the retrieving key memory and carry out a retrieving operation by using the specified retrieving key.

While the retrieving index table contains the identifying information and the names of the retrieving keys, the audio signals of the retrieving keys may also be listed on the retrieving index table in place of or in addition to the names of retrieving keys. Then, the user can easily realize the audio signal of the retrieving key he or she specifies by reproducing the original sound of the audio signal.

While the result of the retrieving operation is recorded on the recording medium in the above description, it may additionally be recorded in a memory controlled by the control section in such a way the data stored in the memory and those stored in the recording medium show clear correspondence.

Other Embodiments

While retrieving keys are registered in a memory in advance or prepared separately in the above description, it may alternatively be so arranged that a retrieving operation starts when the user specifies a part of the audio signal he or she is recording and continues during the recording operation. With this arrangement, it is not necessary to register any retrieving key in advance.

It is not necessary to extract a retrieving key to be registered in the retrieving key memory from an input audio signal or a reproduced audio signal. For instance, a sound source may be provided to produce a retrieving key and the audio signal obtained from the sound source may be used and registered as retrieving key.

It is also possible to obtain an audio signal or a sound characteristic parameter to be registered as retrieving key by way of the internet or a communication network. Then, the audio signal or the sound characteristic parameter will be registered as retrieving key.

It may alternatively be so arranged that, when a recording medium containing a recorded audio signal is marketed, candidate retrieving keys are also recorded on the recording medium. Still alternatively it may be so arranged that, when a recording medium containing a recorded audio signal is marketed, it is accompanied by a memory card storing candidate retrieving keys.

[1st Embodiment of Audio/Video Retrieving Device and Audio/Video Storage Device]

While the above described embodiments deal only with an audio signal as input signal to be scrutinized, an audio/video signal to be recorded and reproduced may be used as object of a retrieving operation if the signal contains an audio signal linked to a video signal.

Figure 16:
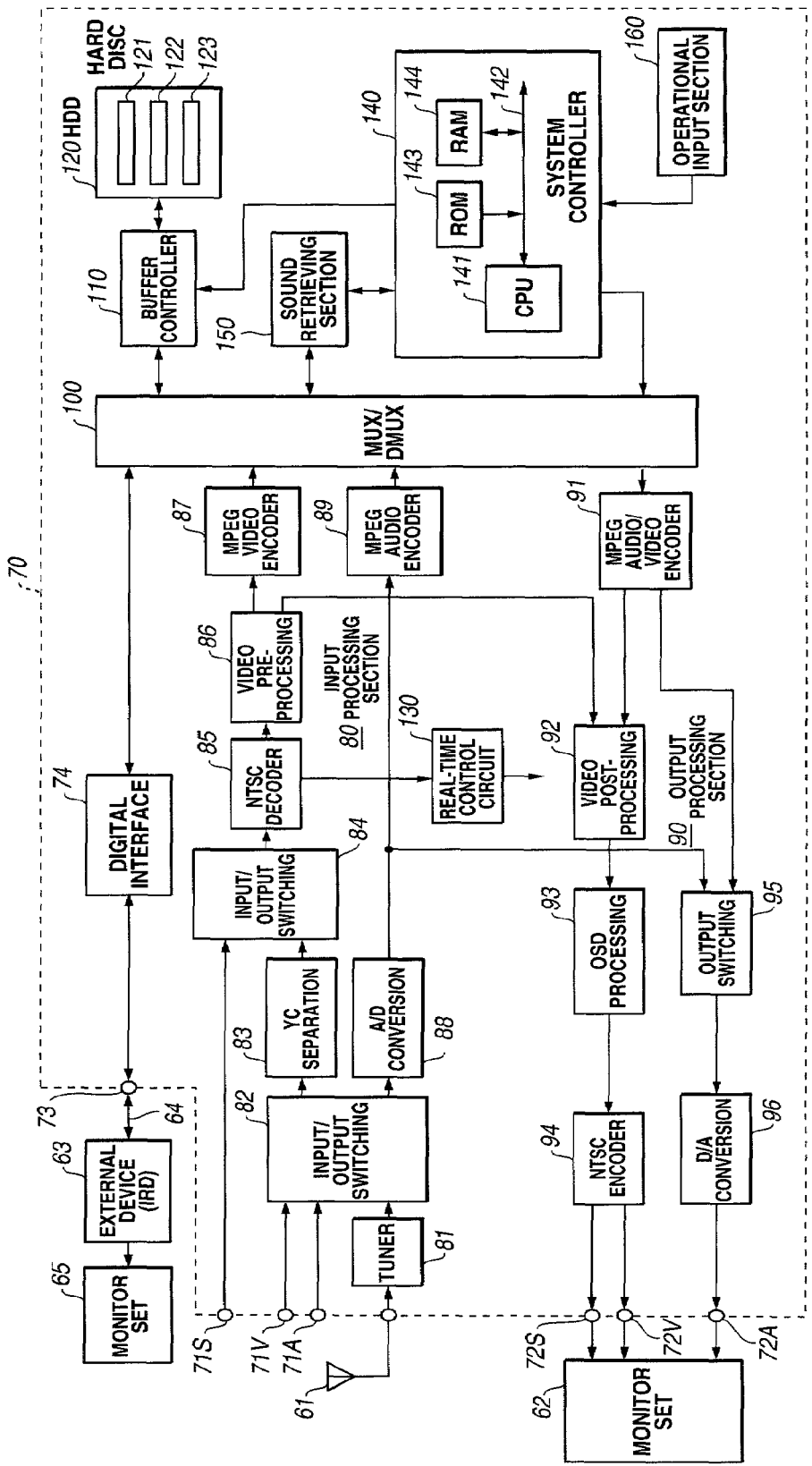
FIG. 16 is a schematic block diagram of a first embodiment of sound/image information retrieving device according to the invention.

FIG. 16 is a schematic block diagram of a recording/reproduction apparatus adapted to record and reproduce an audio/video signal compressed according to the MPEG 2 Standards, to which an embodiment of audio/video retrieving device and that of audio/video storage device are applied.

Note that the recording/reproduction device of FIG. 1 is adapted to compress and encode a video signal and an audio signal according to the MPEG 2 Standards, multiplex the encoded signal and record the signal on a hard disk in a hard disk drive (HDD) as transport stream (TS) of the MPEG system so that the recorded signals may be reproduced from the hard disk.

In the following description, an analog video signal and an analog audio signal are respectively referred to as video signal and audio signal, whereas a digital video signal and a digital audio signal are respectively referred to as digital video data and digital audio data or simple video data and audio data.

Recording/reproduction apparatus 70 is connected to an antenna 61 for receiving analog television broadcasts and comprises analog input terminals 71V, 71A, 71S, analog output terminals 72V, 72A, 72S, a digital input/output terminal 73, a digital interface 74, an input processing section 80, an output processing section 90, a multiplex/demultiplexer 100, a buffer controller 110, a hard disk drive 120, a synchronization control circuit 130, a system controller 140, an audio retrieving section 150 and an operational input section 160.

The hard disk drive 120 of the above described arrangement contains three hard disks 121, 122, 123 and a transport stream is recorded in any of them and reproduced from any of them.

The system controller 140 comprises a CPU (central processing unit) 141 along with a ROM (read only memory) 143 and a RAM (random access memory) 144 that are connected to its system bus 142.

The ROM 143 stores in advance programs to be executed by the CPU 141, which CPU 141 therefore reads out an appropriate one of the programs stored in the ROM 143 and controls the components of the recording/reproduction apparatus 70. The RAM 144 is used to store any other programs and data that are necessary for the CPU 141 to control the components of the recording/reproduction apparatus 70.

The operational input section 160 typically comprises a keyboard, a mouse, buttons, switches and a remote commander and is connected to the system bus 142 of the system controller 140 by way of an input/output interface (not shown).

The audio retrieving section 150 is realized by using any of the above described first through fifth embodiments. However, from the viewpoint that this embodiment of audio/video retrieving device is adapted to retrieve data that are compressed and encoded according to the MPEG Standards, the third embodiment is most advantageously.

It should be noted that the recording medium 13 is the hard disks of the hard disk drive 120 and, therefore, the recording section 12 or 42 and the reproducing section 14 or 44, whichever appropriate, are formed by the buffer controller 110. In other words, the audio retrieving section 150 comprises the components of any of the above described embodiments adapted to audio retrieving operations and excludes the components adapted to recording/reproducing audio data as main data.

The retrieving key memory 32 may be arranged in the audio retrieving section 150 or realized by using part of the memory area of the hard disks of the hard disk drive 120.

Also note that frame numbers, field numbers, PTSs (presentation time stamps) and/or packet numbers are used as linking address information showing the time spans of retrieving and registering operations for digital audio compressed signals and audio/video data containing audio data and video data that are mutually linked for recording and reproduction.

(Analog Input and Recording)

The signal of an analog television broadcast received by the antenna 61 and selected by tuner 81 according to the operation of the operational input section 160 under the control of the system controller 140. Then, the composite video signal and the audio signal of the selected channel are produced out of the received signal by the tuner 81 and fed to one of the input terminals of input switching circuit 82.

On the other hand, a composite video signal from an external device and an audio signal also from an external device are fed respectively to the input terminal 71V and the input terminal 71A, while a separative video signal (comprising a brightness signal and a color difference signal that are separated from each other) also from an external device is fed to the input terminal 71S.

The composite video signal from the input terminal 71V and the audio signal from the input terminal 71A are fed to the other input terminal of the input switching circuit 82. Then, the input switching circuit 82 is operated by the system controller 140 so that either of the composite video signals and the corresponding audio signal are selected and taken out therefrom.

The composite video signal from the input switching circuit 82 is divided into a brightness signal and a color difference signal by YC separation circuit 83, which are then fed to one of the input terminals of another input switching circuit 84. On the other hand, a separate video signal (brightness signal and color difference signal) from the input terminal 71S is fed to the other input terminal of the input switching circuit 84. The switching operation of the input switching circuit 84 is controlled by the system controller 140 so that one of the two sets of a brightness signal and a color difference signal are selected and taken out from the input switching circuit 84.

The brightness signal and the color difference signal take out from the input switching circuit 84 are subjected to an A/D (analog to digital) conversion process by NTSC (National Television System Committee) decoder 85 and then to a chroma encoding process so that a component video data is obtained from the NTSC decoder 85.

The NTSC decoder 85 also separates a vertical synchronizing signal and a horizontal synchronizing signal from the brightness signal taken out from the input switching circuit 84 and a clock and field discriminating signal is generated on the basis of these synchronizing signals. The synchronizing signals and the clock and field discriminating signal are then fed to synchronism control circuit 130, which synchronism control circuit 130 by turn generates clock and timing signals necessary for respective component sections of the recording/reproduction device 70 by referring to those signals and supplies the generated clock and timing signals to the respective component sections.

The video data from the NTSC decoder 85 is subjected to a series of pre-processing operations including a pre-filtering operation by video pre-processing circuit 86 and subsequently fed to MPEG vide encoder 87 and video post-processing circuit 92 of output processing section 90.

MPEG video encoder 87 carries out an encoding operation such as block DCT (discrete cosine transform) on the video data from video pre-processing circuit 86 to generate a video elementary stream (ES), which video elementary stream is then fed to multiplexer/demultiplexer 100.

On the other hand, the audio signal from the input switching circuit 82 is transformed into a digital audio data by A/D converter 88 and subsequently fed to MPEG audio encoder 89 and output switching circuit 95 of output processing section 90.

The MPEG audio encoder 89 compresses and encodes the audio data from the A/D converter 88 by means of the MPEG system to generate an audio elementary stream, which audio elementary stream is then fed to the multiplexer/demultiplexer 100.

The multiplexer/demultiplexer 100 multiplexes the video elementary stream from the MPEG vide encoder 87 and the audio elementary stream from the MPEG audio encoder 89 along with various control signals to generate a transport stream of the MPEG system in its multiplexer. The generated transport stream is then sent out to the buffer controller 110.

The buffer controller 110 intermittently sends out the transport stream that is continuously input from the multiplexer/demultiplexer 100 to the hard disk drive 120. More specifically, since the hard disk drive 120 cannot do any writing operation when it is conducting a seek operation, the buffer controller 110 temporarily stores the transport stream input to it in the buffer. Then, the buffer controller 110 reads out the transport stream stored in the buffer at a rate higher that the rate at which it is input and sends it out to the hard disk drive 120 when the hard disk drive can write data. As a result, the transport stream continuously input to the buffer controller 110 is recorded in the hard disks 121 through 123 without any discontinuity.

The hard disk drive 120 is adapted to write a transport stream on the hard disks 121 through 123 under the control of the system controller 140. Typically IDE (integrated drive electronics) is used as protocol (interface) between the buffer controller 110 and the hard disk drive 120.

(Reproduction and Analog Output)

For a reproducing operation, the hard disk drive 120 reads out the transport stream from the hard disks 121 through 123 and sends it out to the buffer controller 110 under the control of the system controller 140. Opposite to the recording operation, the buffer controller 110 transforms the transport stream input to it intermittently from the hard disk drive 120 into a continuous transport stream and feeds it to the multiplexer/demultiplexer 100.

The multiplexer/demultiplexer 100 analyzes the head of the continuous transport stream in its demultiplexer to isolate the PES (packetized elementary stream) from the transport stream and feeds the isolated PES to the MPEG audio/video decoder 91.

The MPEG audio/video decoder 91 divides the PES from the multiplexer/demultiplexer 100 into a video elementary stream and an audio elementary stream, of which the video elementary stream is decoded by the MPEG video decoder and transformed into a video data of the base band, while the audio elementary stream is decoded by the MPEG audio decoder and transformed into an audio data of the base band. After the transform, the video data is fed to video post-processing circuit 92, whereas the audio data is fed to the audio post-processing circuit 95.

The video post-processing circuit 92 performs operations such as changing over from the video data sent from the MPEG audio/video decoder 91 to the video data sent from the video pre-processing circuit 86 or vice versa, synthetically combining the two video data and/or post filtering.

The video post-processing circuit 92 also performs a compressed still image displaying operation of generating a plurality of representative images (still images) for the GUI (graphical user interface), compressing the representative images and pasting them to a window. The video data of the processed images is then fed to OSD (on screen display) processing circuit 93.

Representative images that can be used for the purpose of the invention may include an impressive scene of the title of a program and an index point (one scene) of the program that facilitates the user/viewer to access the scene he or she wants to see quickly.

Figure 17:
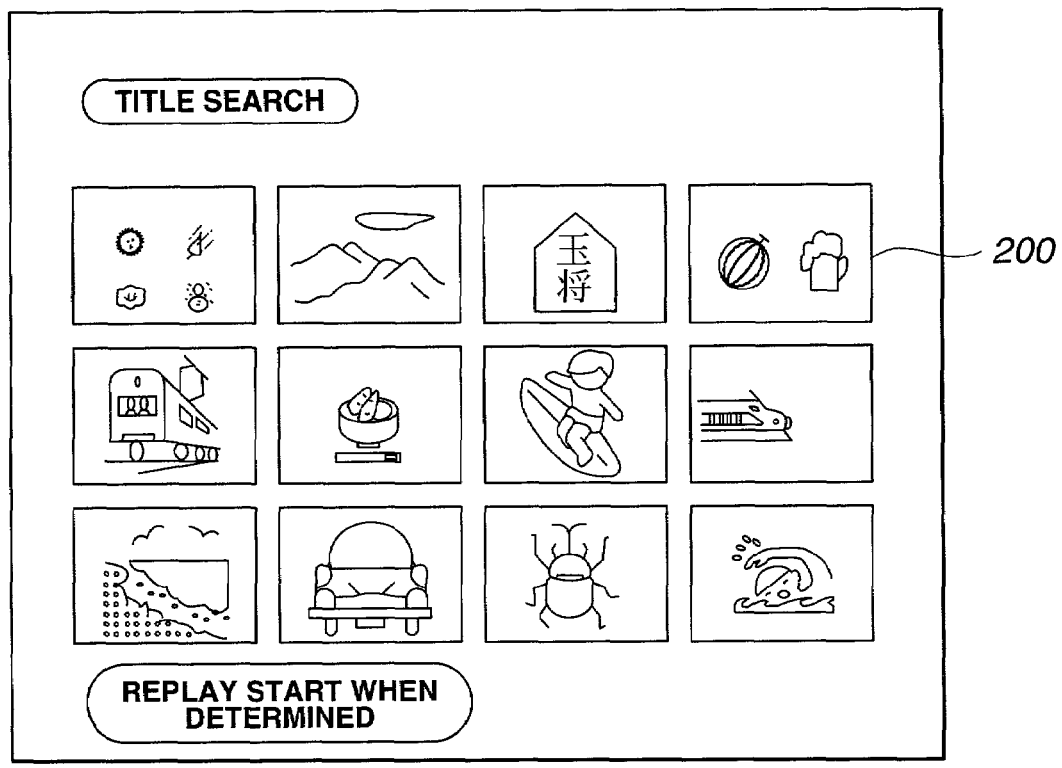
FIG. 17 is a schematic illustration of a first embodiment of sound/image information retrieving device according to the invention.

The OSD processing circuit 93 generates a video data corresponding to the text information given to it and superimposes it on the video data of the window sent from the video post-processing circuit 92 under the control of the system controller 140. Then, it sends out the processed image data to NTSC encoder 34. FIG. 17 shows typical representative still images that are produced by compressing the respective original images. In FIG. 17, a total of 16 compressed still images 200 are pasted to the window.

The NTSC encoder 94 performs an operation of D/A (digital to analog) conversion on the video data (component video data) from the OSD processing circuit 93 after or without transforming it into a brightness data and a color difference data to generate a separative video signal and a composite video signal that are analog signals, of which the separative video signal is fed to the output terminal 72S, while the composite video signal is fed to the output terminal 72V.

On the other hand, the output switching circuit 95 selectively takes out either the audio data from the MPEG audio/video decoder 91 or the audio data from the A/D converter 88 under the control of the system controller 140. The selected audio data is then converted into an analog audio signal by the D/A converter 36 and fed to the output terminal 72A.

The separative video signal fed to the output terminal 72S, the composite video signal fed to the output terminal 72V and the audio signal fed to the output terminal 72A are then sent to the monitor 2 of an external television receiving set so that the user/view can watch the corresponding image displayed on the monitor 2 and listen to the sound also output from the monitor 2.

(Recording/Reproduction of Audio/Video Data from External Apparatus)

The digital input/output terminal 73 and the main body 100 is connected to each other by the digital interface 74 in the recording/reproduction apparatus 70 so that the transport stream input from an external apparatus 63 can be recorded on the hard disks 121 through 123 and the transport stream reproduced form the hard disks 121 through 123 can be output to the external apparatus 63 by connecting the digital input/output terminal 73 to the external apparatus 63.

The external apparatus 63 may be an IRD (integrated receiver decoder) or a personal computer. An IEEE (Institute of Electrical and Electronics Engineers) 1394 digital interface is typically used for the digital interface 74, while an IEEE 1394 serial bus is typically used for serial bus 64 connecting the external apparatus 63 and the digital input/output terminal 73.

The transport stream input from the external apparatus 63 to the digital input/output terminal 73 by way of the serial bus 64 is then processed by the digital interface 74 and sent to the multiplexer/demultiplexer 100 and then further from the multiplexer/demultiplexer 100 to the buffer controller 110 so that it is recorded on the hard disks 121 through 123 by the hard disk drive 120.

At the same time, the PES in the transport stream to be recorded is isolated from the latter by the demultiplexer of the multiplexer/demultiplexer 100 and fed to the MPEG audio/video decoder 91 so that the analog video signal and the analog audio signal that are reproduced can be obtained respectively at the output terminals 72V, 72S and 72A.

For a reproducing operation, a transport stream is read out of the hard disks 121 through 123 by the hard disk drive 120 and the reproduced transport stream is sent to the buffer controller 110 and further from the buffer controller 110 to the multiplexer/demultiplexer 100. Then, it is processed by the digital interface 74 and output to the digital input/output terminal 73 and further from the digital input/output terminal 73 to the external apparatus 63 by way of the serial bus 64 so that the that the user/view can watch the corresponding image displayed on the monitor 7 connected to the external apparatus 63 and listen to the sound also output from the monitor 7.

At the same time, the PES of the reproduced transport stream is isolated from the latter by the demultiplexer of the multiplexer/demultiplexer 100 and fed to the MPEG audio/video decoder 91 so that the analog video signal and the analog audio signal that are reproduced can be obtained respectively at the output terminals 72V, 72S and 72A.

(Audio Retrieval)

As described above, the audio retrieving section 150 operates like any of the first through fifth embodiments of the invention for retrieving sound segments. Particularly, the audio retrieving section 150 can extract not only the audio signal obtained by specifying a retrieving key sound characteristic parameter but also the part of the video signal corresponding to the retrieved audio signal on the basis of the linked relationship thereof. For instance, if the audio signal to be scrutinized is that of a music program, it is possible extract only the scenes of the parameter where a specific music sounds.

As described above, the audio signal to be scrutinized is not limited to the signals recorded in the hard disk drive 120 and may be selected from the audio data received or input from outside. In the case of this embodiment, since a plurality of input audio data are available, it is possible for the user to analyze the audio signal contained in one of the input audio/video signals and sequentially display the retrieved images in the window of the display screen while he or she is watching the image and listening the sound of some other input audio signal on the monitor 62 (the window may be made to appear constantly or only when such an image is retrieved). For instance, the voice print of a favorite actor or actress may be used as retrieving key sound characteristic parameter and, whenever the actor or actress is caught, the corresponding scene may be displayed in the window.

It is also possible to register a retrieving key sound characteristic parameter for each of the compressed still images 200 as shown in FIG. 17 so that, when the user specifies any of the compressed still images 200, an operation of audio retrieval starts, using the retrieving key sound characteristic parameter corresponding to the specified image 200.

For example, assume that the compressed still image specified by the user shows a person and the voice print of the person is stored in the retrieving key memory as retrieving key sound characteristic parameter. Then, once the retrieving key for the person in the compressed still image is specified, the embodiment can immediately start extracting the scenes where the person appears and speaks. Thus, the compressed still images can be used as indexes for retrieving operations if a retrieving key sound characteristic parameter is registered in advance for each of the compressed still images.

Inversely, it is also possible to register a scene extracted by a specific retrieving key sound characteristic parameter so as to display it as a compressed still image on the display screen. For instance, a scene accompanied by a characteristic sound of a person as voice print may be registers as compressed still image to be displayed on the display screen if the person does not appear on the scene.

It is also possible to put audio signals operating as retrieving keys or retrieving key sound characteristic parameters on a broadcast signal for multiplexing. Then, the user can select and use a desired one of the audio signals operating as retrieving keys or the retrieving key sound characteristic parameters or register and store appropriate ones in the retrieving key memory 32.

[2nd Embodiment of Audio/Video Retrieving Device and Audio/Video Storage Device]

While the above described first embodiment is adapted to use retrieving keys only for retrieving audio signals, this second embodiment is adapted to use retrieving keys for retrieving not only audio signals but also video signals.

With the second embodiment, retrieving key image characteristic parameters that can be used as retrieving keys for retrieving video signals of characteristic images are registered in advance. Retrieving key image characteristic parameters that can be used for the purpose of the invention may include the brightness and its changes, the color tone and its changes and a scene showing a person or an object and its changes.

Like retrieving key sound characteristic parameters, retrieving current image characteristic parameters can be obtained by analyzing the time span of the video signal specified by the user out of the input audio/video signal or by analyzing a video signal specifically input to the embodiment so as to be operating as retrieving key. It is also possible to obtain retrieving keys in advance typically by means of a personal computer and register them in the embodiment.

Then, an image resembling the image of the retrieving key can be retrieved out of the video signal to be scrutinized by comparing the image characteristic parameter obtained by analyzing the video signal to be scrutinized and the retrieving key image characteristic parameter and computationally determining the similarity of them. Then, a desired part of the input audio/video signal can be retrieved on the basis of the result of the retrieving operation conducted on the audio signal and that of the retrieving operation conducted on the video signal.

For the purpose of the invention, a retrieving key image characteristic parameter and a corresponding retrieving key sound characteristic parameter may be registered separately as so many retrieving keys or linked to each other for registration. For instance, a retrieving key image characteristic parameter of an image of a person and a retrieving key sound characteristic parameter of the voice print of the person may be linked for registration.

With this second embodiment, it is possible to separately specify a retrieving key image characteristic parameter and a retrieving key sound characteristic parameter and carry out respective retrieving operations. It is also possible to specify a retrieving key so as to use a retrieving key image characteristic parameter and a retrieving key sound characteristic parameter that are linked to each other.

When conducting a retrieving operation, using both a retrieving key sound characteristic parameter and a retrieving key image characteristic parameter, all the parts of an audio/video signal that resemble the retrieving key and are retrieved by using either of the parameters may be output or the parts of an audio/video signal that resemble the retrieving key and are retrieved by using the both parameters so that they have at least something in common.

As a result of the retrieving operation, the parts that are retrieved may be displayed by using the address information thereof. As far as image is concerned, the leading scenes of the parts that are retrieved may be displayed as compressed still images in a manner as described earlier. It is also possible to sequentially replay the retrieved parts of the signal as in the case of the above described embodiments for audio retrieval. Furthermore, it is also possible to link the result of the retrieving operation and the retrieving key used for the operation and store them in a memory so that the result may be reproduced by using the retrieving key.

With this second embodiment where both a time span of a video signal is detected by using an image characteristic parameter and a time span of an audio signal is detected by using a sound characteristic parameter, a retrieving operation can be made very meaningful. For instance, it is possible to retrieve a part of an audio/video signal where different scenes may appear but the narration continues.

If a retrieving key is specified so as to use a retrieving key image characteristic parameter and a retrieving key sound characteristic parameter that are linked to each other and the parts of an audio/video signal retrieved by using the retrieving key are displayed as so many compressed still images, the displayed images will be meaningful not only in terms of image but also in terms of sound.

As described above in detail, according to the invention, there is provided a method and an apparatus that can retrieve the part of a speech of a specific speaker or a tune of an instrument out of the recorded audio signal without requiring an operation of putting markers or recording counter readings or timings at the time of recording the audio signal. More specifically, the audio signal to be scrutinized and the audio signal to be used as retrieving key are analyzed to obtain respective sound characteristic parameters and the obtained sound characteristic parameters are compared to determine the similarity of the two signals.

According to the invention, retrieving keys can be registered in advance so that a retrieving operation can be conducted with ease by selectively using any of the registered retrieving keys.

Additionally, unlike the case of using markers, any part of the audio signal to be scrutinized can be retrieved by using a retrieving key that is prepared in advance without recording the audio signal.

Finally, when retrieving a desired scene out of an audio/video signal, the reliability of the retrieving operation can be improved by using a sound characteristic parameter and an image characteristic parameter. Then, the retrieved scene will be meaningful both in terms of image and in terms of sound.

The invention claimed is:

1. A sound retrieving method comprising:
   a storing step for storing one or more audio signals as retrieving keys;
   a first analyzing step for reading an audio signal among said one or more audio signals and analyzing the audio signal to output a first sound parameter that is dependent on structural factors of the sound source of the audio signal;
   a second analyzing step for analyzing an audio signal to be analyzed to output a second sound characteristic parameter that is dependent on structural factors of the sound source of the audio signal;
   a comparing step for comparing the first sound characteristic parameter with the second sound characteristic parameter to calculate a similarity therebetween; and
   a presenting step for presenting a determined result of the similarity based on the calculated similarity.

2. The sound retrieving method according to claim 1, wherein said audio signals operating as retrieving keys are extracted from the audio signal to be analyzed and stored.

3. The sound retrieving method according to claim 1, wherein said retrieving key sound characteristic parameters are obtained by the user by analyzing the part of the audio signal to be analyzed as specified by the user and said audio signal to be analyzed is analyzed by using the retrieving key sound characteristic parameters.

4. The sound retrieving method according to claim 1, wherein more than one retrieving keys are sequentially used on one by one basis by a predetermined time unit for the process of computationally determining the similarity.

5. The sound retrieving method according to claim 1, wherein the result of each retrieving process using a retrieving key is displayed for the audio signal to be analyzed on a temporal basis.

6. The sound retrieving method according to claim 1, wherein only the part or parts of the audio signal to be analyzed resembling the retrieving keys are extracted and reproduced as a result of the retrieving process.

7. A sound retrieving method comprising:
- a storing step for storing one or more sound characteristic parameters as retrieving keys, each of the sound characteristic parameters being dependent on structural factors of a sound source of an audio signal;
- a reading step for reading a first sound characteristic parameter among said one or more sound characteristic parameters;
- an analyzing step for analyzing an audio signal to be analyzed to output a second sound characteristic parameter that is dependent on structural factors of the sound source of the audio signal;
- a comparing step for comparing the first sound characteristic parameter with the second sound characteristic parameter to calculate a similarity therebetween; and
- a presenting step for presenting a determined result of the similarity based on the calculated similarity.

8. The sound retrieving method according to claim 7, wherein said retrieving key sound characteristic parameters are those obtained by analyzing said audio signal operating as retrieving keys that are extracted from said audio signal to be analyzed.

9. The sound retrieving method according to claim 7, wherein the result of each retrieving process using a retrieving key is displayed for the audio signal to be analyzed on a temporal basis.

10. The sound retrieving method according to claim 7, wherein only the part or parts of the audio signal to be analyzed resembling the retrieving keys are extracted and reproduced as a result of the retrieving process.

11. The sound retrieving method according to claim 7, wherein more than one retrieving keys are sequentially used on one by one basis by a predetermined time unit for the process of computationally determining the similarity.

12. A sound information storing method comprising:
- a storing step for storing one or more audio signals as retrieving keys;
- a first analyzing step for reading an audio signal among said one or more audio signals and analyzing the audio signal to output a first sound parameter that is dependent on structural factors of the sound source of the audio signal;
- a second analyzing step for analyzing an audio signal to be analyzed to output a second sound characteristic parameter that is dependent on structural factors of the sound source of the audio signal;
- a comparing step for comparing the first sound characteristic parameter with the second sound characteristic parameter to calculate a similarity therebetween; and
- a recording step for recording a determined result of the similarity based on the calculated similarity.

13. The sound information storing method according to claim 12, wherein said result of the retrieving process is recorded with said audio signal on said recording medium.

14. The sound information storing method according to claim 12, wherein each of said retrieving key sound characteristic parameters obtained from respective audio signals operating as retrieving keys is obtained as a result of an analyzing process conducted on a part of said input audio signal selected and extracted according to an instruction of the user.

15. The sound information storing method according to claim 14, wherein said retrieving key sound characteristic parameters of said one or more than one audio signals operating as retrieving keys obtained as a result of the analyzing process conducted on a part of said audio signal selected and extracted according to an instruction of the user are stored in different respective memory areas of a buffer memory and subsequently read out and used for the process of retrieving a part of the input audio signal by computationally determining the similarity.

16. The sound information storing method according to claim 14, wherein said one or more than one parts of said input audio signal selected and extracted according to respective instructions of the user are stored in different respective memory areas of a buffer memory as audio signals operating as retrieving keys and said one or more than one audio signals operating as retrieving keys are read out from said buffer memory and analyzed to produce respective retrieving key sound characteristic parameters so that said process of retrieving a part of the input audio signal by computationally determining the similarity is conducted by using said audio signals operating as retrieving keys.

17. The sound information storing method according to claim 14, wherein said sound characteristic parameters of said audio signals operating as retrieving keys or said audio signals operating as retrieving keys are recorded with said result of the retrieving process on said recording medium.

18. The sound information storing method according to claim 12, wherein said sound characteristic parameters of said audio signals operating as retrieving keys or said audio signals operating as retrieving keys are recorded with said result of the retrieving process on said recording medium.

19. A sound information retrieving device comprising;
- a storing means for storing one or more audio signals as retrieving keys;
- a first analyzing means for reading an audio signal among said one or more audio signals and analyzing the audio signal to output a first sound parameter that is dependent on structural factors of the sound source of the audio signal;
- a second analyzing means for analyzing an audio signal to be analyzed to output a second sound characteristic parameter that is dependent on structural factors of the sound source of the audio signal;
- a comparing means for comparing the first sound characteristic parameter with the second sound characteristic parameter to calculate a similarity therebetween; and
- a presenting means for presenting a determined result of the similarity based on the calculated similarity.

20. The sound information retrieving device according to claim 19, wherein said result displaying means displays the said resembling part as determined by said retrieving means simultaneously with the temporal progress of said audio signal to be analyzed.

21. The sound information retrieving device according to claim 19, further comprising a holding means for holding said one or more than one retrieving key sound characteristic parameters and a reading means for reading selected retrieving key sound characteristic parameters from said holding means and supplying them to said similarity determining means.

22. The sound information retrieving device according to claim 21, further comprising a retrieving key registering means for extracting sound characteristic parameters as retrieving keys from said audio signal to be analyzed by analyzing said audio signal according to an instruction of the user and holding them in said holding means.

23. The sound information retrieving device according to claim 19, wherein more than one retrieving keys are sequentially used on a one by one basis by a predetermined time unit for the process of computationally determining the similarity.

24. A sound information retrieving device comprising:
a storing means for storing one or more sound characteristic parameters as retrieving keys, each of the sound characteristic parameters being dependent on structural factors of a sound source of an audio signal;
a reading means for reading a first sound characteristic parameter among said one or more sound characteristic parameters;
an analyzing means for analyzing an audio signal to be analyzed to output a second sound characteristic parameter that is dependent on structural factors of the sound source of the audio signal;
a comparing means for comparing the first sound characteristic parameter with the second sound characteristic parameter to calculate a similarity therebetween; and
a reproducing means for reproducing a determined result of the similarity based on the calculated similarity.

25. The sound information retrieving device according to claim 24, further comprising a retrieving key registering means for extracting said audio signals operating as retrieving keys from said audio signal to be analyzed according to an instruction of the user and holding them in said holding section.

26. The sound information retrieving device according to claim 24, further comprising a holding means for holding said one or more than one retrieving key sound characteristic parameters and a reading means for reading selected retrieving key sound characteristic parameters from said holding means and supplying them to said similarity determining means.

27. The sound information retrieving device according to claim 26, further comprising a retrieving key registering means extracting sound characteristic parameters as retrieving keys from said audio signal to be analyzed by analyzing said audio signal according to an instruction of the user and holding them in said holding means.

28. The sound information retrieving device according to claim 24, wherein more than one retrieving keys are sequentially used on a one by one basis by a predetermined time unit for the process of computationally determining the similarity.

29. A sound information storage device comprising:
a retrieving means for retrieving one or more sound characteristic parameters as retrieving keys, each of the sound characteristic parameters being dependent on structural factors of a sound source of an audio signal;
a reading means for reading a first sound characteristic parameter among said one or more sound characteristic parameters;
an analyzing means for analyzing an audio signal to be analyzed to output a second sound characteristic parameter that is dependent on structural factors of the sound source of the audio signal;
a comparing means for comparing the first sound characteristic parameter with the second sound characteristic parameter to calculate a similarity therebetween; and
a recording means for recording a determined result of the similarity based on the calculated similarity.

30. The sound information storage device according to claim 29, wherein said result of the retrieving process is recorded with said audio signal on said recording medium.

31. The sound information storage device according to claim 29, further comprising a retrieving key registering means for obtaining sound characteristic parameters as retrieving keys by extracting a part of said audio signal to be analyzed according to an instruction of the user and holding them in said holding means.

32. The sound information storage device according to claim 29, wherein more than one retrieving keys are sequentially used on a one by one basis by a predetermined time unit for the process of computationally determining the similarity.

* * * * *

UNITED STATES PATENT AND TRADEMARK OFFICE
CERTIFICATE OF CORRECTION

PATENT NO. : 7,260,226 B1 Page 1 of 1
APPLICATION NO. : 09/830222
DATED : August 21, 2007
INVENTOR(S) : Miura et al.

It is certified that error appears in the above-identified patent and that said Letters Patent is hereby corrected as shown below:

In claim 4, column 30, line 65, "more than one retrieving keys are" should read --more than one retrieving key is--.

In claim 4, column 30, line 66, "on one by one basis" should read --on a one by one basis--.

In claim 11, column 31, line 40, "more than one retrieving keys are" should read --more than one retrieving key is--.

In claim 11, column 31, line 41, "on one by one basis" should read --on a one by one basis--.

In claim 19, column 32, line 36, "comprising;" should read --comprising:--.

In claim 23, column 33, line 6, "more than one retrieving keys are" should read --more than one retrieving key is--.

In claim 28, column 34, line 5, "more than one retrieving keys are" should read --more than one retrieving key is--.

In claim 32, column 34, line 38, "more than one retrieving keys are" should read --more than one retrieving key is--.

Signed and Sealed this

Twenty-fifth Day of December, 2007

JON W. DUDAS
*Director of the United States Patent and Trademark Office*